(12) United States Patent
Shashoua et al.

(10) Patent No.: US 12,001,861 B1
(45) Date of Patent: Jun. 4, 2024

(54) SYSTEMS AND METHODS FOR PROVIDING DESKTOP SOFTWARE SUITES FOR WEB APPLICATIONS

(71) Applicant: Zive, Inc., Stamford, CT (US)

(72) Inventors: Eric Shashoua, Stamford, CT (US); Pall Ivarsson, Manhattan Beach, CA (US); Ryan Shetley, Cape Girardeau, MO (US); Anton Zmieiev, Reshetylivka (UA)

(73) Assignee: ZIVE, INC., Stamford, CT (US)

( * ) Notice: Subject to any disclaimer, the term of this patent is extended or adjusted under 35 U.S.C. 154(b) by 0 days.

(21) Appl. No.: 18/059,069

(22) Filed: Nov. 28, 2022

Related U.S. Application Data

(63) Continuation of application No. 17/409,248, filed on Aug. 23, 2021, now abandoned.

(Continued)

(51) Int. Cl.
  *G06F 9/451*  (2018.01)
  *G06F 3/0482* (2013.01)
  (Continued)

(52) U.S. Cl.
  CPC ............ *G06F 9/451* (2018.02); *G06F 3/0482* (2013.01); *G06F 3/0483* (2013.01);
  (Continued)

(58) Field of Classification Search
  CPC ........... G06F 9/451; G06F 9/046; G06F 9/08; G06F 3/0482; G06F 3/0483; G06F 2203/04804; H04L 51/212
  See application file for complete search history.

(56) References Cited

U.S. PATENT DOCUMENTS

| | | | |
|---|---|---|---|
| 7,908,647 B1 * | 3/2011 | Polis | G06F 16/907 |
| | | | 713/153 |
| 10,496,381 B2 | 12/2019 | Seksenov et al. | |

(Continued)

OTHER PUBLICATIONS

Hoffman, Chris "How to Use Gmail's Advanced Search Features & Create Filters". How-To Geek [online], retrieved on Jun. 2, 2022, Retrieved from the Internet (URL: https://www.howtogeek.com/107307/how-to-use-gmails-advanced-search-features-create-filters/), Mar. 8, 2012 (Year: 2012).*

(Continued)

*Primary Examiner* — Daniel Samwel
(74) *Attorney, Agent, or Firm* — WILSON SONSINI GOODRICH & ROSATI

(57) ABSTRACT

Disclosed are systems and methods for providing a desktop application for displaying enhanced web-based services. The desktop application may retrieve one or more web-based services from one or more universal resource locators (URLs). The desktop application may then, based on the types of web-based services retrieved, provide user interfaces complementary to the web-based services. These user interfaces may include features familiar to desktop application users, such as file menus, edit menus, and toolbars. The user interfaces may also include enhancements, such as efficient searching and sorting features. The web-based services may include mail services, scheduling services, and customer relationship management (CRM) platforms.

22 Claims, 38 Drawing Sheets

Related U.S. Application Data

(60) Provisional application No. 63/080,870, filed on Sep. 21, 2020, provisional application No. 63/069,521, filed on Aug. 24, 2020.

(51) Int. Cl.
*G06F 3/0483* (2013.01)
*H04L 51/046* (2022.01)
*H04L 51/08* (2022.01)
*H04L 51/212* (2022.01)

(52) U.S. Cl.
CPC ............ *H04L 51/046* (2013.01); *H04L 51/08* (2013.01); *H04L 51/212* (2022.05); *G06F 2203/04804* (2013.01)

(56) References Cited

U.S. PATENT DOCUMENTS

| | | | | |
|---|---|---|---|---|
| 11,314,692 | B1* | 4/2022 | Gutierrez | G06F 16/1734 |
| 2008/0235594 | A1* | 9/2008 | Bhumkar | G06F 16/957 |
| | | | | 707/E17.014 |
| 2008/0301562 | A1* | 12/2008 | Berger | G06F 16/958 |
| | | | | 715/733 |
| 2009/0228779 | A1* | 9/2009 | Williamson | H04L 67/289 |
| | | | | 715/205 |
| 2009/0271735 | A1* | 10/2009 | Anderson | G06F 9/451 |
| | | | | 715/815 |
| 2011/0264525 | A1* | 10/2011 | Bhatia | G06Q 30/0256 |
| | | | | 715/764 |
| 2013/0262673 | A1* | 10/2013 | Hall | G06F 21/33 |
| | | | | 709/225 |
| 2014/0237375 | A1* | 8/2014 | Schachtel | H04L 67/02 |
| | | | | 715/741 |
| 2015/0341300 | A1* | 11/2015 | Swain | H04L 51/42 |
| | | | | 707/738 |
| 2016/0248756 | A1* | 8/2016 | Cicchitto | H04L 63/0815 |
| 2017/0344612 | A1* | 11/2017 | Seyfert | G06F 16/2471 |
| 2018/0063352 | A1* | 3/2018 | Yasuhara | H04N 1/00344 |
| 2019/0065217 | A1 | 2/2019 | Girdhar et al. | |
| 2019/0155881 | A1 | 5/2019 | Shashoua et al. | |
| 2019/0342378 | A1* | 11/2019 | Vysotsky | H04L 67/104 |

OTHER PUBLICATIONS

Price, Dan "How to Make the Most out of the Chrome App Launcher". MakeUseOf [online], retrieved on Jun. 2, 2022, Retrieved from the Internet (URL: https://www.makeuseof.com/tag/make-most-chrome-app-launcher/), Sep. 22, 2015 (Year: 2015).*

Hoffman, Chris. How to Use Gmail's Advanced Search Features & Create Filters. How-To Geek [online], retrieved on Jun. 2, 2022, Retrieved from the Internet (URL: https://www.howtogeek.conn/107307/how-to-use-gnnails-advanced-search-features-create-filters/), Mar. 8, 2012 (2012).

Price, Dan. How to Make the Most out of the Chrome App Launcher. Make Use Of [online], retrieved on Jun. 2, 2022, Retrieved from the Internet (URL: https://www.nnakeuseof.conn/tag/nnake-most-chrome-app-launcher/ ), Sep. 22, 2015 (2015).

U.S. Appl. No. 17/409,248 Office Action dated Jun. 7, 2022.

* cited by examiner

SYSTEMS AND METHODS FOR PROVIDING DESKTOP SOFTWARE SUITES FOR WEB APPLICATIONS

CROSS-REFERENCE

This application is a continuation of U.S. Non-Provisional application Ser. No. 17/409,248, filed on Aug. 23, 2021, which claims priority to U.S. Provisional Application No. 63/069,521, filed on Aug. 24, 2020, and U.S. Provisional Application No. 63/080,870, filed on Sep. 21, 2020, each of which is entirely incorporated herein by reference.

BACKGROUND

Current web-based productivity suites, such as Google Docs, Microsoft Office365 online documents, and iCloud Pages, may only enable users to access tools through web browser applications. For instance, the websites are viewed in a web browser application and served to the user. In some cases, the web-based application may not be capable of delivering well-orchestrated user experience. For example, users may have to switch between different accounts and applications by accessing different webpages/tab-based windows which hampers the user experience. Moreover, certain features may not be available in the web-based application due to the limitation of browser-based user interface or speed limitation of downloading the static/dynamic content.

SUMMARY

Recognized herein is a need for systems and methods that make web-based applications or services work together seamlessly like a full-featured desktop application suite. The present disclosure provides a standalone desktop application with enhanced features for web-based services. In particular, systems and methods of the present disclosure provide improved user interfaces and features to web-based services using a desktop-based application. This may beneficially allow users to conveniently access the web-based services via a desktop application with enhanced functionalities and features that are not available within a browser. In addition to launching the web-based services with the desktop application, the disclosed systems and methods may enhance the web-based tools, providing them with improved, unique functionality in the desktop applications. Systems and methods of the present disclosure may provide additional features to supplement those already provided by the web-based tools thereby improving the user experience. For example, systems of the present disclosure may allow multiple accounts to be used simultaneously for a single application (e.g., email) or across multiple applications.

In an aspect of the present disclosure, a method is provided for enhancing a web-based application using a desktop-based application. The method comprises: (a) rendering the web-based application with the desktop-based application; (b) receiving input from a user via a graphical user interface (GUI) of the desktop-based application executed on a computer, which user input is for selecting a user account from a plurality of user accounts; and (c) using the graphical user interface of the desktop-based application to display the web-based application along with one or more other web-based applications associated with the user account selected in (b), wherein the web-based application and the one or more other web-based applications are displayed on the GUI in a format native to the computer.

In some embodiments, the web-based application comprises at least one tool selected from the group consisting of an email tool, a calendar tool, a word processing tool, a spreadsheet tool, a presentation tool, a storage-based tool, a content management tool, enterprise management tool, and a task management tool. In some embodiments, the user account is assigned a color different from another color of another user account of the plurality of user accounts. In some embodiments, the web-based application is an electronic mail (email) application that is displayed with multiple tabs associated with multiple user accounts using the desktop-based application. In some cases, the GUI displays the web-based application in different colors associated with the multiple user accounts. In some cases, the GUI provides a plurality of filtering options for filtering emails by recent days, importance and attachments.

In some embodiments, the method further comprises receiving input from the user via the graphical user interface for performing a search across the web-based application and the one or more other web-based applications. In some embodiments, the method further comprises performing a search across the web-based application and the one or more other web-based applications using a search tool, which search tool is displayed on the GUI in a format native to the computer.

In some embodiments, the web-based application comprises a video conferencing window. In some cases, at least a portion of the video conferencing window is at least partially transparent. In some cases, at least a portion of the video conferencing window comprises one or more graphical elements on a desktop of an operating system of the computer.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
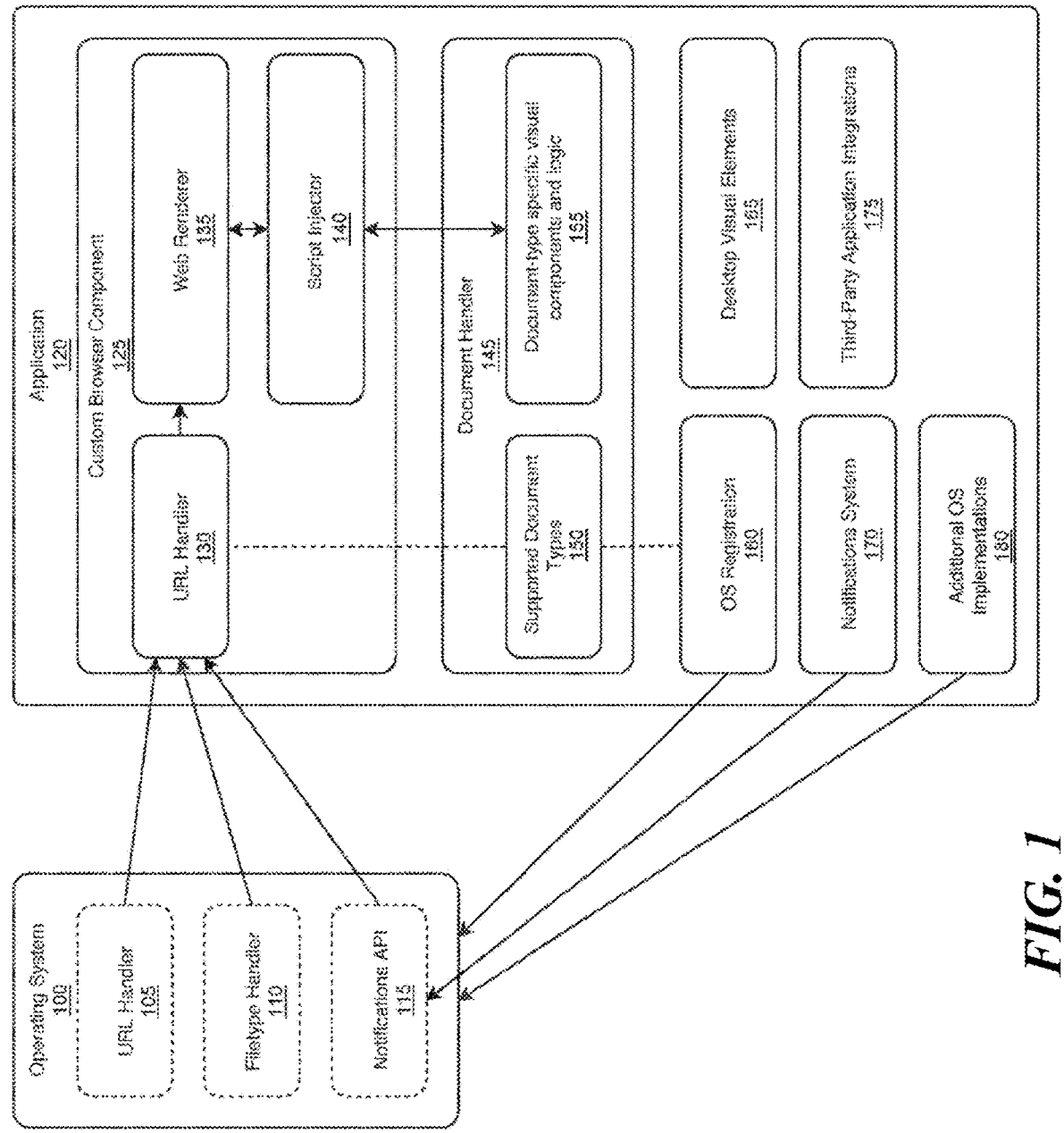
FIG. 1 illustrates a system comprising an application and an operating system for interacting with web-based content.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Reference throughout this specification to "some embodiments," or "an embodiment," means that a particular feature, structure, or characteristic described in connection with the embodiment is included in at least one embodiment. Thus, the appearances of the phrase "in some embodiments," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry. The electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Disclosed are systems and methods for providing user interfaces and features using a desktop-based application for web-based services. This may beneficially allow users to conveniently access the web-based services via a desktop application with enhanced functionalities and features that are not available within a browser. For example, a desktop user interface may be provided for a suite of web-based services allowing the set of web-based applications to work together seamlessly like a full-featured desktop office productivity suite. The web-based services may include a wide range of services including, but not limited to, productivity services such as those found in GOOGLE® G-SUITE or APPLE® iCLOUD, Microsoft Office365 online documents, and iCloud Pages, Docs, Sheets, Slides, electronic email (email), spreadsheet, calendar, word processing, video-communication service such as Google Meet, Google Hangouts, or various other services. The web-based services can include services in any field such as customer relationship management (CRM) services (e.g., SALESFORCE®) or content management services.

Users may interact with web-based content or documents using a desktop-based application. For example, user interfaces of the provided desktop application may enable a user to interact with the contents of a web-based document associated with a universal resource locator (URL) using a web content renderer, such that the desktop application that the user used to edit the document is configured to appear as an application native to the desktop computer and its operating system.

Further, user interfaces of the standalone desktop application may provide powerful, enhanced features that improve the user experience in using the web-based tools. For instance, for the productivity tools, the user interfaces may provide enhanced filtering and searching capabilities, improved flexibility in terms of customizing the display of the user interface, or methods to quickly switch between accounts when opening documents. With respect to CRM tools, the user interfaces may provide functions such as cleaning up and organizing workspaces. Such tools may enable users of the CRM to use the tool more efficiently. In another example, the user interfaces disclosed herein may provide an account delegation feature allowing multiple accounts to be used together with full fidelity and no conflicts. Such account delegation feature can be applied to a variety of web-based applications such as Gmail, Drive, Docs, Sheets, Slides, Hangouts, Calendar, Keep, Forms, Sites and various other applications. For instance, users may be permitted to create keyboard shortcuts for creating calendar invites, opening documents, opening emails from different accounts, or be provided with other features that are not available within a browser.

The web-based services may be accessible via particular URLs. The desktop application may retrieve these services from their particular URLs and render them in application windows. In this way, the disclosed systems and methods make it easier for those more familiar with desktop applications to use these web-based services.

In some embodiments, methods and systems of the present disclosure may be implemented in an application and an operating system. The operating system can be any type of operating system (e.g., Windows, Linux, Mac OS, iOS, Chrome OS, etc.) on a user device that is used by a user to interact with web-based content. The application may include user interface features specifically designed for allowing interaction with those webpage-based documents in a manner of a desktop-based application. FIG. 1 illustrates a system comprising an application 120 and an operating system 100 for interacting with web-based content, in accordance with one embodiment. In some embodiments, the operating system 100 may include a URL handler 105, a filetype handler 110, and a notifications application program interface ("API") 115. In some embodiments, the operating system 100 may include a URL handler 105 or may include a filetype handler 110. The methods and architectures of interacting with web-based content via a desktop-based application and its various components are described in US 20190155881 entitled "desktop enabling of web documents" which is incorporated by reference herein in the entirety.

A filetype handler 110 is a reference to a program registered with the desktop computer's operating system to handle the processing of particular type(s) of files. When a file of a given type is opened or executed on the computer, the operating system 100 may follow the handler 110 to invoke the application 120 that is capable of handling the file. In some embodiments, the filetype handler 110 may verify a file path associated with a document prior to opening it with the default registered application 120.

Similarly, a URL handler 105 is a reference to a program registered with a web browser to handle the processing of a URL of a specific protocol.

In some cases, both the URL handler 105 and the filetype handler 110 point to the same registered application 120. In some cases, the filetype handler 110 may be registered to handle files containing URLs pointing to web-based documents. When these files are opened on the desktop computer, the filetype handler 110 sends the URL in the file to the URL handler 130 of the application 120, which processes the URL and the associated web-based document. If instead a URL is selected in the web browser, the URL handler 105 may route the URL to the application 120 where it may be processed beginning with the URL handler 130. In some cases, the application 120 may register as a filetype handler for specific file-types that may contain URLs associated with web-based documents. In some cases, once an example of a specified file type is selected, the application may initiate processing and display of the document.

In some embodiments, to interact with the desktop environment, the operating system 100 may communicate with the application 120. The application 120 may be registered with operating system 100 specific systems, including the filetype handler 110, URL handler 105, and the notifications API 115. In some embodiments, the application 120 may comprise several components enabling the application 120 to handle specific types of document-based web content. The application 120 may be integrated directly into the desktop environment of the computer.

In some embodiments, the operating system 100 is in communication with the application 120 through the URL handler 130. In some embodiments, the application 120 may have a custom browser component 125 comprising a URL handler 130, a web renderer 135, and a script injector 140. In some embodiments, the script injector 140 is configured to inject JavaScript into a web-based document. The custom browser component 125 may interact with websites through standard web technologies such as, e.g., HTTP.

As described above, the application 120 may be invoked when a file containing a URL is opened by a filetype handler 110 associated with such files or when a URL relating to document editing is selected in a web browser and opened by a URL handler 105. Either way, the URL handler 130 receives the applicable URL and retrieves the web-based document associated with the URL before providing it to the web renderer 135 for display to the end user. The display process may be iterative, as the script injector 140 adds scripts to the retrieved web document that are subsequently displayed by the web renderer 135. As a user interacts with the rendered document and the scripts therein, the script injector 140 may change, add, or delete scripts from the document.

This iterative injection/render cycle enables the implementation of functionality found in desktop applications within the context of web documents being edited by, in this embodiment, a specialized web browser that has been developed to be similar in appearance to a desktop application. For example, iterative script injection and rendering can be used to add a menu listing recently viewed documents in a selectable list, such that selection of a particular item causes the application 120 to load the selected document.

In some embodiments, the web-based document may be retrieved by the application 120 through a URL. URLs can stem from links selected by a user within the application 120, a secondary application (such as a web browser), or through a clipboard copy action. Files may also contain a URL for the application 120 to retrieve, rather than having document data stored in a local disk. When the application 120 is activated in some embodiments by, e.g., double-clicking on an icon on a desktop associated with the URL-containing file, the application 120 may process the URL from the file similarly to a URL selected by a user clicking on it and display the selected document.

The custom browser component 125 may be called when the application 120, secondary application (not shown), or operating system 100 receives an instruction to open a URL or a file containing a URL. In some embodiments, the URL handler 130 is a component of the custom browser component 125 capable of determining whether the application 120 is appropriate for the URL, the file, or the URL contained in the file.

In some embodiments, the custom browser component 125 may also include a web renderer 135. In some embodiments, the URL handler 130 may be in communication with the web renderer 135. A web renderer 135 may be used in web browsers to retrieve, render, and control web content. In some embodiments, the web renderer 135 may retrieve and render content associated with URLs received from the URL handler 130. In some embodiments, the web renderer 135 may comprise a plurality of handlers usable by the application 120 to facilitate bi-directional communication with the application 120 and websites.

In some embodiments, through the script injector 140 each document sent to the web renderer 135 may have a series of scripts injected into the webpage associated with the document. In some embodiments, the scripts may modify the behavior of a document. In some embodiments, a script may modify a visual element 155 of the web-based document. For example, a script may remove a displayed URL from the document when the document is being displayed by the application 120.

In some embodiments, after a script is injected into a loaded document, the script may begin communication with the application 120. In some embodiments, the application 120 may interact with the web-based document and be configured to perform tasks including, but not limited to, recording a list of recent documents opened, saving a workspace that may be restored after closing the application or shutting down the computer, and registering the document with an operating server-level feature 160, such as a timeline feature.

The custom browser component 125 may be configured to consult a document handler 145, external to the custom browser component 125, to determine if the application 120 is capable of processing the document associated with the file name or URL. In some embodiments, the document handler 145 may be a logical component and may access a list of supported document types 150 to determine if the application 120 is capable of opening the document. In some embodiments, the supported document types 150 are identified from the information provided by the URL handler 130, such as the protocol associated with the URL or the filetype extension. In some embodiments, the document hander 145 may access predefined document type settings such as visual window look and size, scripts that may be used for modifying document behavior, and the general pipeline for desktop and document interaction in response to handling a web-document of a particular type.

In some embodiments, the supported document type list 150 may also be used as part of the URL handling process 130 in the browser component 125. In some embodiments, the document handler 145 may provide the majority of the logic behind the script injector 140, determining the timing and content of scripts added to the web-based document. In some embodiments, the document handler 145 may be configured to control desktop-level interaction with documents.

In some embodiments, the custom browser component 125 may be configured to respond to a user-initiated action outside of the document itself. For example, the custom browser component 125 may respond to a user interacting with a desktop-level file menu action to insert content directly from a user's desktop into a document associated with the application 120.

In some embodiments, the application 120 may include a network-change handler to determine the state of the internet connection and if the application 120 should treat a disconnection or connection to the internet differently.

In some embodiments, a sleep handler may be used to handle events when the computer has entered and exited a sleep state, giving the application 120 an option to retrieve new content and perform maintenance tasks during a sleep state or in a transition to a sleep state.

In some embodiments, a user may access the web-based services or content via the desktop application user interface. In some cases, the user interface may be a graphical user interface (GUI) rendered through the application executed on a user device. The GUI may show graphical elements or one or more animatable graphical elements that permit a user to interact with the web-based content in a desktop-like environment. In some cases, desktop GUI may be visually distinct from a web browser window and may be designed to resemble a window from an application native to the operating system of the desktop computer. For example, the user interface displaying the web-based documents on the desktop may be designed to lack or otherwise remove various browser-based elements, including the URL address bar, tab bar, and links to external websites. In some embodiments, the graphical user interface may display a web-based document without displaying the URL associated with the web-based document.

In some cases, the desktop GUI and/or the application 120 may provide enhanced features to the web-based applications. For example, the application 120 may include an account delegation engine allowing multiple accounts to be used simultaneously for a single web-based application/service (e.g., email) or across multiple web-based applications/services. Various examples of the desktop GUI and the enhanced features are described later herein.

In some embodiments, the application 120 may control one or more visual elements on the graphical user interface or the desktop of a computer 165. For example, in some embodiments, the graphical user interface may associate a particular type of file with an icon associated with the application 120, and the application 120 itself may have its own icon. These icons may appear on a toolbar on the desktop of a computer, separate from the icon associated with the computer's web browsing program(s).

As an example, the application 120 may open a web-based document in a window dedicated to showing that document rather than, e.g., a tab-based window for opening multiple documents and/or websites. In some embodiments, the dedicated window may have a window title stored and recognized by the operating system 100 relating specifically to that document and not the website serving that document or a generic descriptor for a collection of unrelated windows. In some embodiments, the document window may be treated by the operating system 100 as a separate, unique window rather than a collection of windows.

In another example, the application 120 may detect a previously unopened document. If a user instructs the application 120 to open the document, in some embodiments, the application may detect the size and/or type of the document and may automatically display a window that is adjusted to the size and shape of that particular document type. For example, in some embodiments, a Google Doc may open in a window that is as wide as the document inside that window, without space to either side, and in a format that is tall and narrow rather than generically wide like it may in the browser. In some embodiments, a spreadsheet such as a Google Sheet may open in a window that is wide and short. In some embodiments, a presentation document such as a Google Slides document may open in a window that is closer in dimensions to a square.

In some embodiments, the application 120 and/or the GUI may contain desktop-based visual elements 165 such as a menu bar familiar to desktop users, including file, edit, and view tabs. These tabs may have functionality that directly ties into the application 120 or active document displayed by the application 120 implemented either in the application 120 itself or in the document through script injection.

In some embodiments, the application 120 may integrate with the operating system provided notifications system 170, including the notification API 115 of the operating system. This integration may enable the application to trigger desktop notifications relating to events occurring within the application 120. In some embodiments, for example, the application 120 may detect a new email and may relay a notification to the notifications system 170. In some embodiments, the notifications system 170 may then generate a notification on the desktop, such that the user may be alerted to the event. In some embodiments, the notification may be a visual notification. In some embodiments, the notification may be an audible notification.

In some embodiments, third parties can integrate additional functionality into the application 120 using discrete applications, browser plugins, or injected scripts. These integrations 175 may include components such as third-party analytics, single sign-on integrations, and user-encryption.

Figure 2:
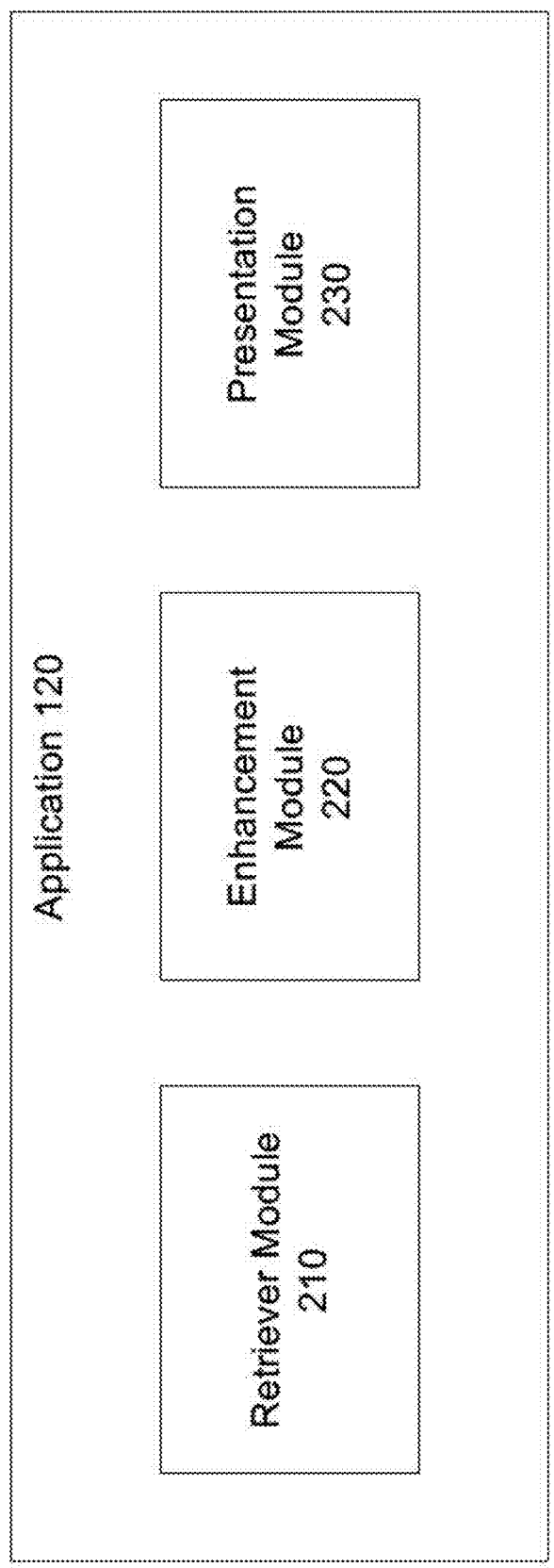
FIG. 2 shows a diagram of functional components of an application.

FIG. 2 schematically illustrates a diagram of a plurality of functional components of the application 120. The functional components may be performed by one or more of the components as described in FIG. 1. For example, the retriever module functions may be performed by the custom browser component 125. Depending on the type of web-based tool, the functions of the presentation module and enhancement module may be performed by the document handler or by the third-party application integrations 175.

The retriever module 210 may retrieve the web-based applications from a URL. The web-based applications may include web-based services or a suite of web-based services/tools. For example, the web-based tool may be an email tool, a calendar tool, a word processing tool, a spreadsheet tool, a presentation tool, a storage-based tool, a content management tool, enterprise management tool, tasks management tool and various others. The retriever module may classify the tool as one of the aforementioned tools.

The presentation module 230 may present the web-based tool as a desktop application. The presentation module may access one or more application programming interfaces (APIs) for desktop presentation/display, including displaying in windows that may be minimized, maximized, or moved around the screen. For example, the presentation module may add interactive elements such as a menu to the web-based tool that differs from a browser menu. For instance, the presentation module may add a file menu, an edit menu, a toolbar menu, or another type of menu. The presentation module may enable any one or more features for controlling the appearance/display of the web-based tool. For instance, a video conferencing window can be pinned to any location on the desktop, multiple windows associated with different applications and/or different user accounts can be displayed simultaneously and separately on the desktop, and each window can be individually customized.

The enhancement module 230 may provide additional functionality/features to the web-based tool presented as a desktop application. Functionality that the enhancement module can provide may include, for example, account delegation features with improved access to accounts, filtering options, powerful search tools, improved video display options for online meeting and various other functions, and features. The enhancement module may also include enhanced features for customer relationship management (CRM) software such as checking for duplicates and organizing application records.

Figure 3:
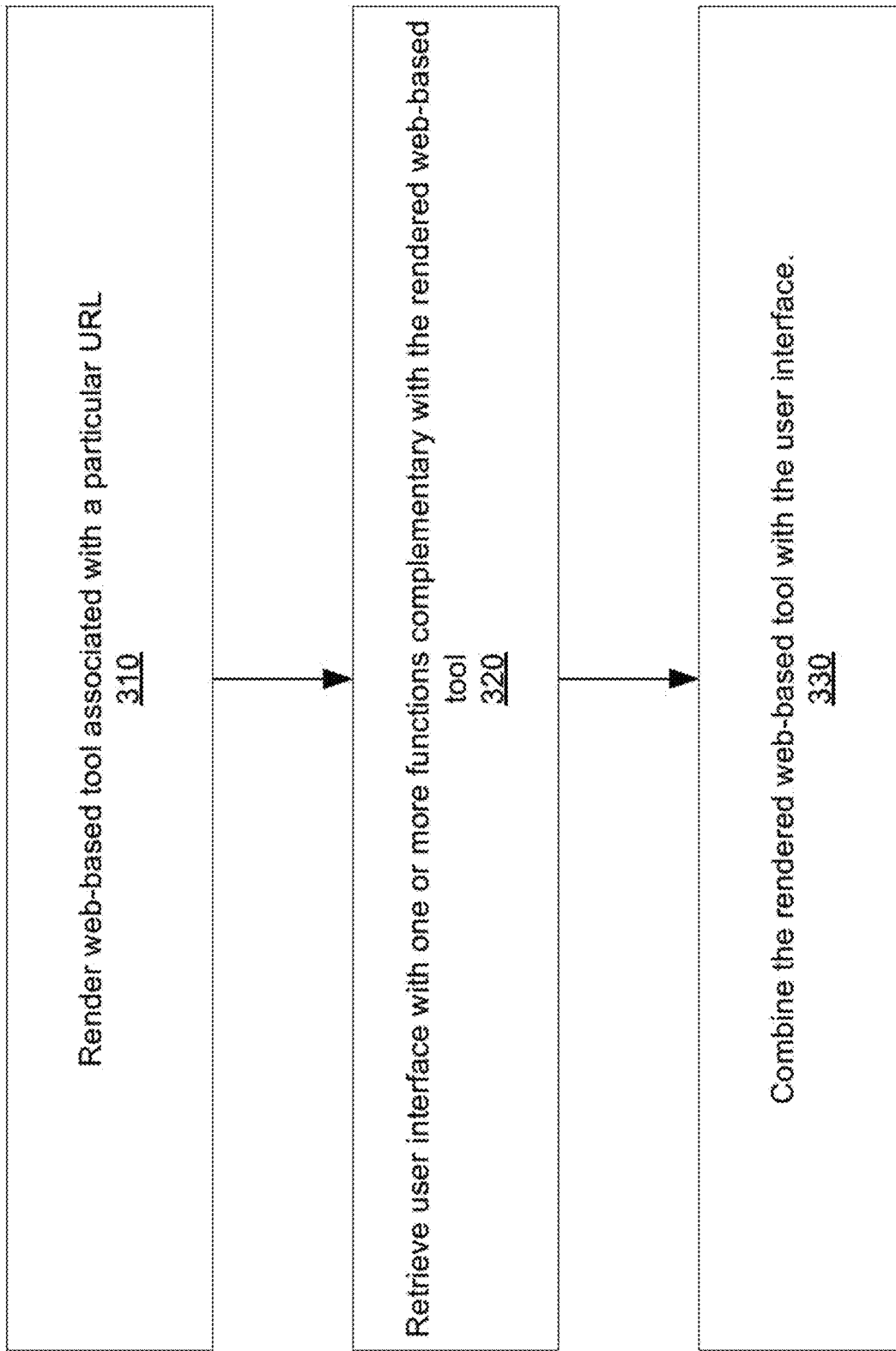
FIG. 3 shows a process flow diagram for launching an enhanced web-based tool from an application interface.

FIG. 3 shows a process flow diagram 300 for launching an enhanced web-based tool from an application interface. The desktop application may render a web-based tool associated with a particular URL (operation 310). A user may launch the desktop application from an icon on the user's desktop, from an icon or button in the user's taskbar, or from accessing the application in the user's computer file system. Using the application, the user may select a software tool from a plurality of tools.

Next, based on the rendered web-based tool, the desktop application may retrieve a user interface with one or more functions complementary with the rendered web-based tool (operation 320). The web-based tool may prompt the user for authentication or authorization information. The application may enable users to log in simultaneously to multiple accounts. Examples of complementary functions may be sorting, searching, or tabbing tools for email, formatting tools for word processing, or organization tools for CRMs.

The desktop application may combine the rendered web-based tool with the user interface, creating an enhanced web-based tool (operation 330). The enhanced web-based tool is configured to appear native to the computer's operating system. The web-based tool within the application may appear substantially similar to its web-based embodiment, but with additional/enhanced features embedded within the original user interface. Such additional features may beneficially improve user experience with interacting with the tools or the web-based content. For example, a mail tool may have additional interactive graphical elements (e.g., filtering functions) for filtering and sorting the email, initiating a cloud search, opening recent documents across different web-based tools and the like and such additional interactive graphical elements may be provided alongside the original menu from the web-based interfaces. A word processing tool may have additional toolbars underneath the original toolbars of the word processing tool's web-based interface. Additionally, the desktop application may combine the web-based tool with desktop-based features, such as freedom of movement of application windows around the screen.

Examples of User Interface

As described above, the provided systems and methods may enhance the web-based tools with additional features that may not be available within a web-based application. In some cases, the enhanced features may include an account delegation capability. The account delegation feature may beneficially allow users to access multiple accounts simultaneously with complete fidelity and no conflicts.

Figure 4A:
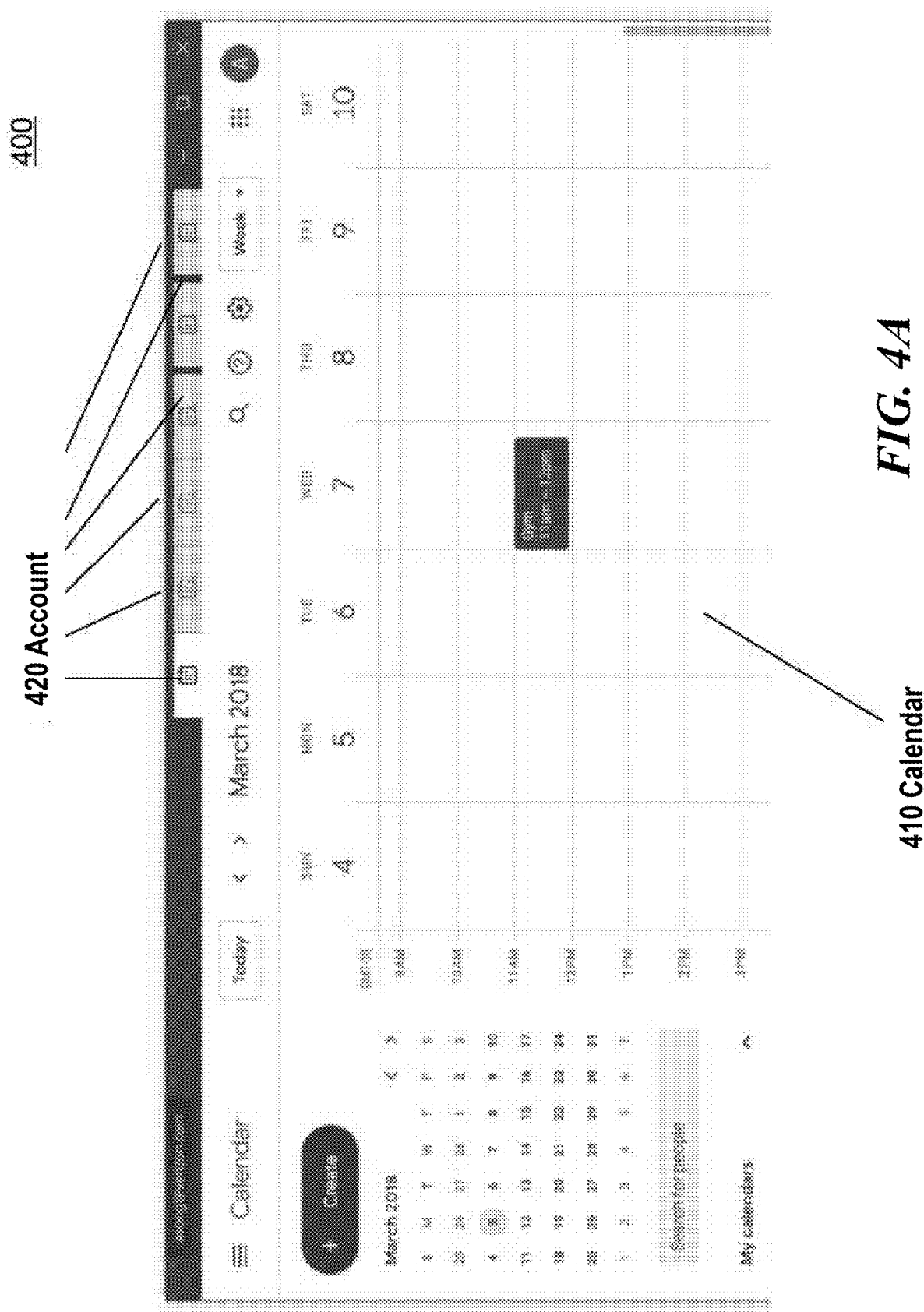
FIG. 4A and FIG. 4B illustrate a calendar user interface.
Figure 4B:
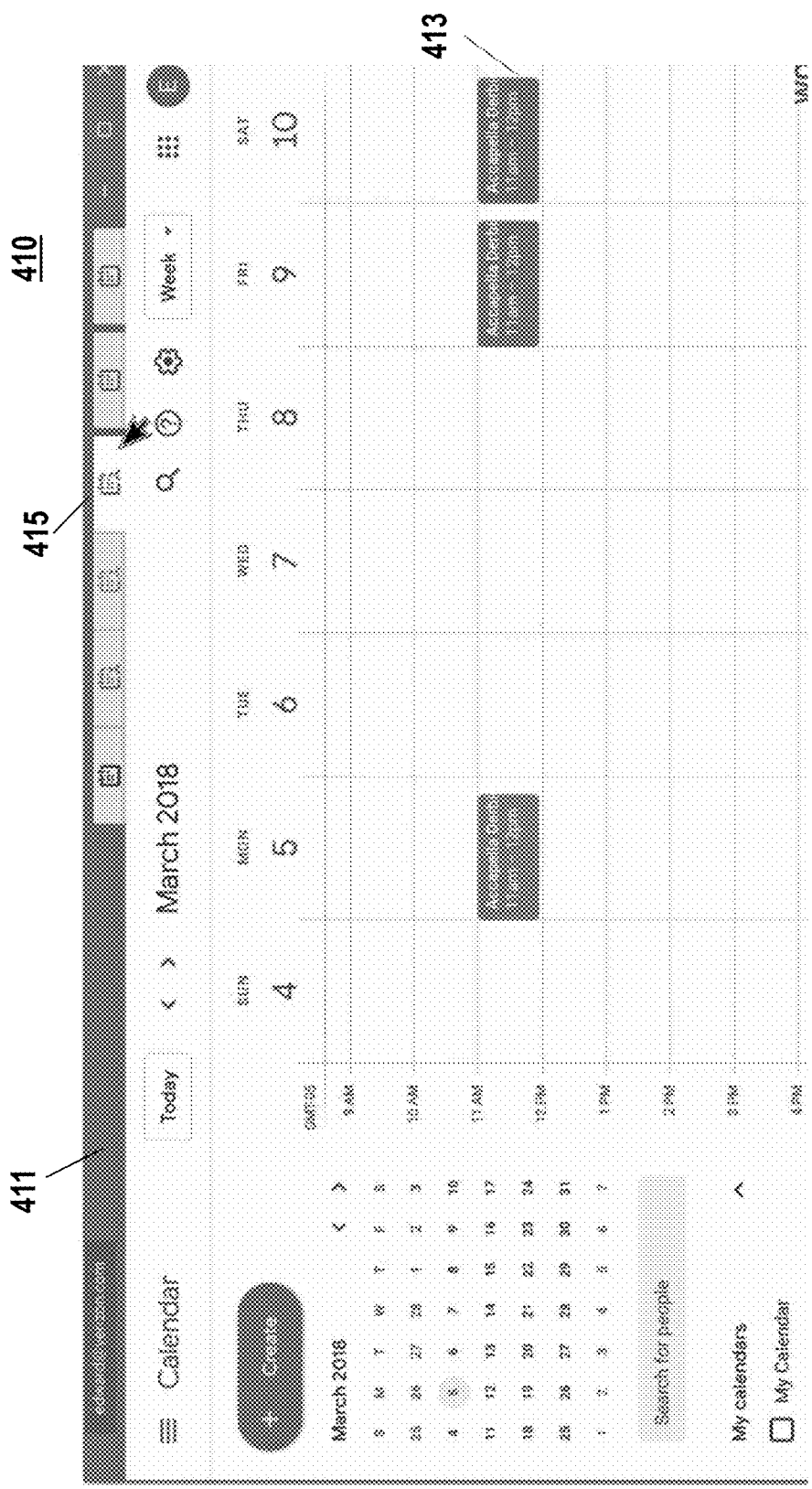

FIG. 4A and FIG. 4B illustrate a calendar user interface 400, in accordance with some embodiments of the present disclosure. As illustrated in FIG. 4A, a calendar user interface may include a calendar view 410. The calendar module may support multiple accounts access. The multiple accounts 420 may appear as tabs and color-coded within the desktop GUI. For example, different accounts may be assigned graphical representations in various colors such as red, orange, yellow, green, blue, indigo, or violet, or combinations of colors thereof. The graphical representations may comprise any appearance, including any image, icon, shape, color, or combinations thereof. In some cases, document-type specific window widgets may be displayed with visual elements in a color associated with the account.

A user may easily switch between the accounts by clicking one of the tabs instead of logging out and then logging back in. For example, the user may click on a different account tab (e.g., green color tab) and the corresponding calendar view 410 is displayed as shown in FIG. 4B. In some cases, different accounts may have different color themes to visually assist the user in distinguishing among different accounts. For example, the color of the graphical representation 415, background color of the calendar window 411 or one or more visual element 413 associated with a given account may be different from the color associated with a different account.

Figure 4C:
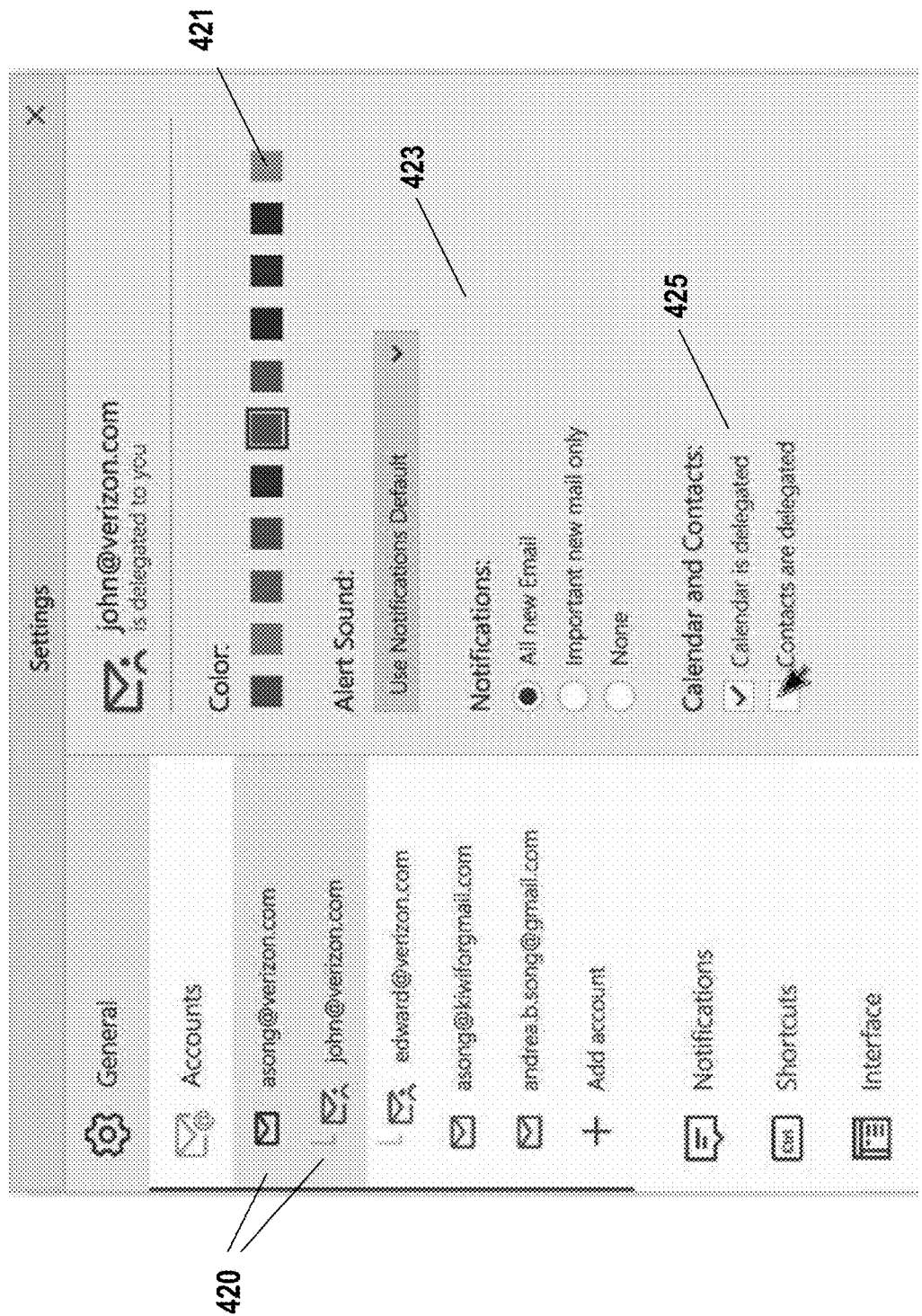
FIG. 4C shows an example of a user interface for setting up account delegation features.

FIG. 4C shows an example of a user interface for setting up account delegation features. As illustrated in the example, the delegate accounts 420 may be accessible under a main account menu. Different user accounts 420 may be nested under the main account. A color 421 can be assigned to each individual account to provide visual distinction between different accounts. The color theme may be automatically applied to one or more tools/applications (e.g., email, calendar, contact, slides, sheet, etc.) delegated to an account.

The provided systems may permit a user to customize a delegate account by selecting, combining or delegating one or more applications/tools for an individual account. For example, a user may select the calendar and/or contact 425 modules to be delegated to a selected account. Various other functionalities 423 such as notification can also be individually configured for each account. In some cases, multiple windows of different applications associated with the same account may be displayed simultaneously on the desktop for the user to interact with. In such case, the multiple windows may be displayed in the same theme color. In some cases, multiple windows of same/different applications associated with different accounts may be displayed simultaneously on the desktop and such multiple windows may be displayed in different theme colors.

Graphical user interface of the present disclosure may be provided for a suite of web-based services allowing the set of web-based applications to work together seamless like a full-featured desktop office productivity suite. As described above, the web-based services may include, for example, productivity services such as those found in GOOGLE® G-SUITE or APPLE® iCLOUD, Microsoft Office365 online documents, file storage and synchronization service such as Drive, iCloud Pages, Docs, Sheets, Slides, email, spreadsheet, calendar, word processing, online video conferencing service or other services. The web-based services may include a suite of cloud computing, productivity and collaboration tools.

Figure 5:
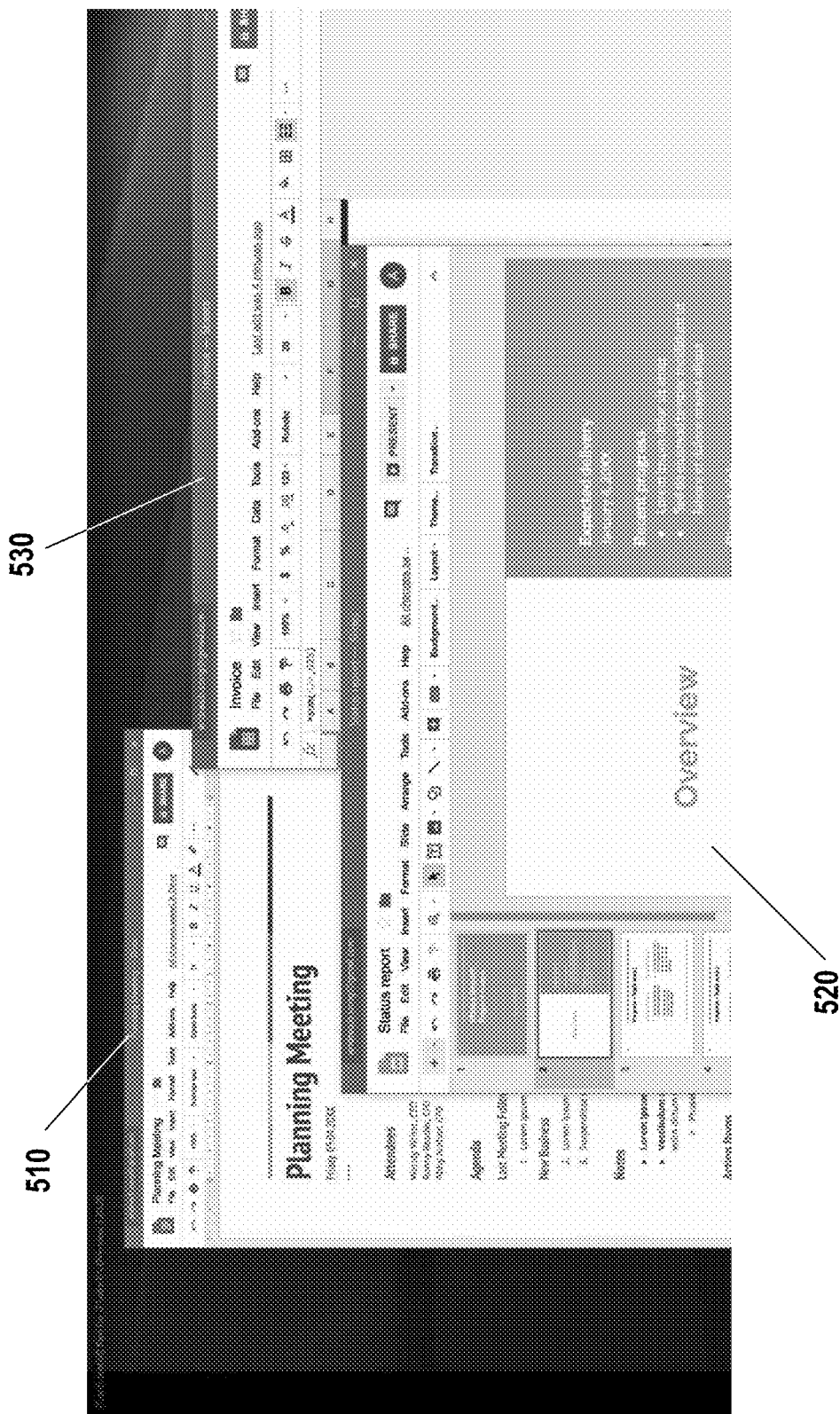
FIG. 5 shows examples of desktop graphical user interface allowing users to work across multiple applications.

FIG. 5 shows examples of desktop GUI allowing users to work across multiple applications such as Docs 510, Slides 520 and Sheets 530. In the illustrated example, three web-based documents 510, 520, and 530 of different web-based applications are launched by the application. Users may interact with these documents in a similar manner as interacting with a desktop office productivity suite.

Figure 6A:
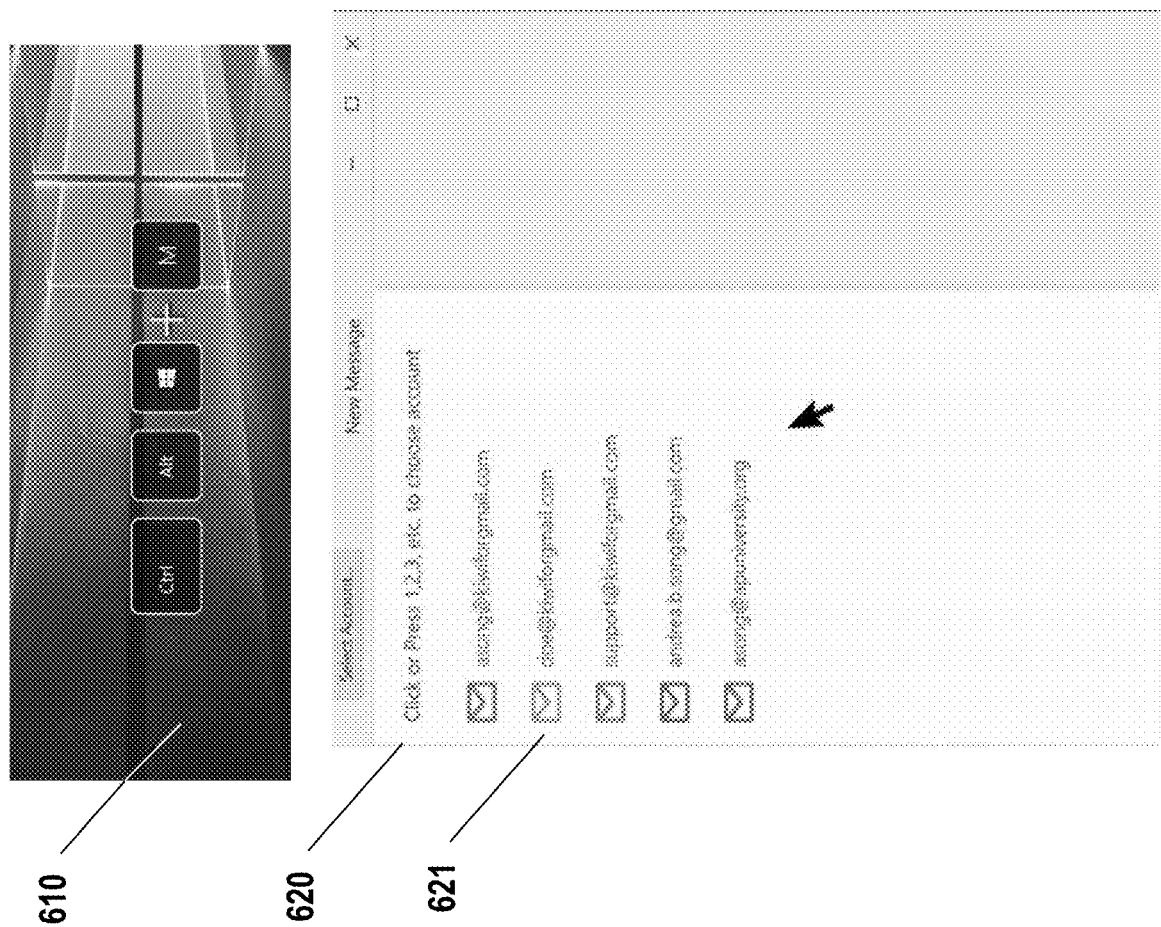
FIG. 6A and FIG. 6B show examples of using application-specific keyboard shortcuts to perform web-based tool tasks.
Figure 6B:
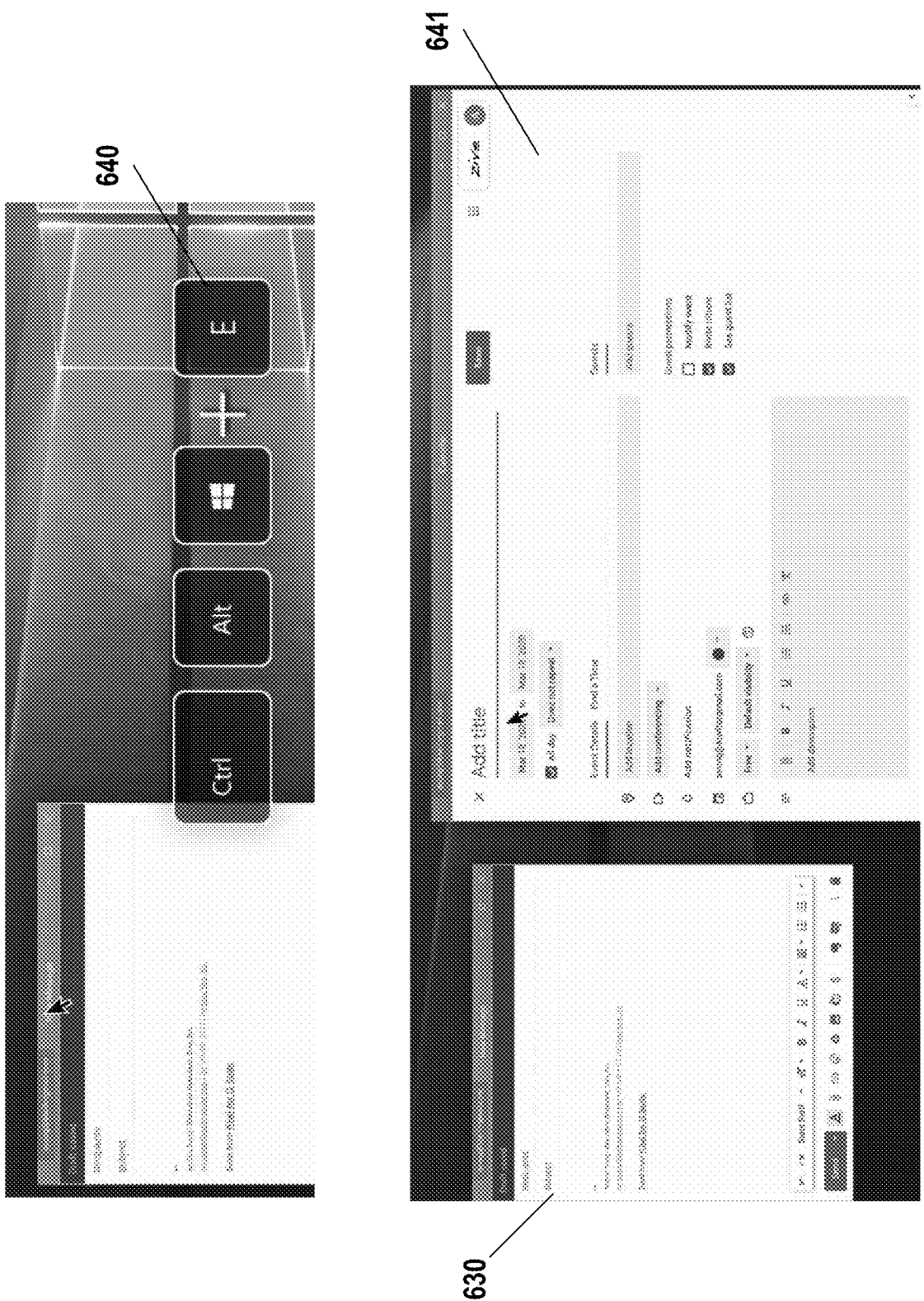

The desktop application and GUI may also allow users to use global keyboard shortcuts to launch different applications. FIG. 6A and FIG. 6B show examples of using application-specific shortcuts to perform web-based tool tasks, in accordance with some embodiments of the present disclosure. For example, as shown in FIG. 6A, the key combination Ctrl+Alt+Win+M 610 may launch a new email application. When a user presses these keys in combination, the application opens a new email window 620. Additionally, the new email window may enable the user to select an email account 621 from a plurality of accounts. Once the user selects the account, the application opens a window 630 as shown in FIG. 6B for creating the email, including fields for the recipient, subject, and body of the message. Additionally, the user may use a different key combination Ctrl+Alt+Win+E 640 to launch a new calendar invite window 641. Similarly, the calendar invite window may also allow the user to select an account from a plurality of accounts to create or edit an invite. In some cases, the calendar window and the email window displayed concurrently on the desktop may be associated with different accounts according to the user selection. In such case, the calendar window and the email window may be displayed in different theme colors to prevent the user from getting confused of the different accounts.

Another enhanced feature provided by the GUI is the capability of performing cloud-based search across multiple applications (e.g., Gmail, Docs, Drive, Calendar, etc.) and can be initiated from any current application. The cloud-based search (cloud search) may allow users to conduct search and retrieve information such as data or files within a workspace, data and files across a group of tools/applications, data and files across one or more search domains, or data stored in third-party databases and the like.

Figure 7A:
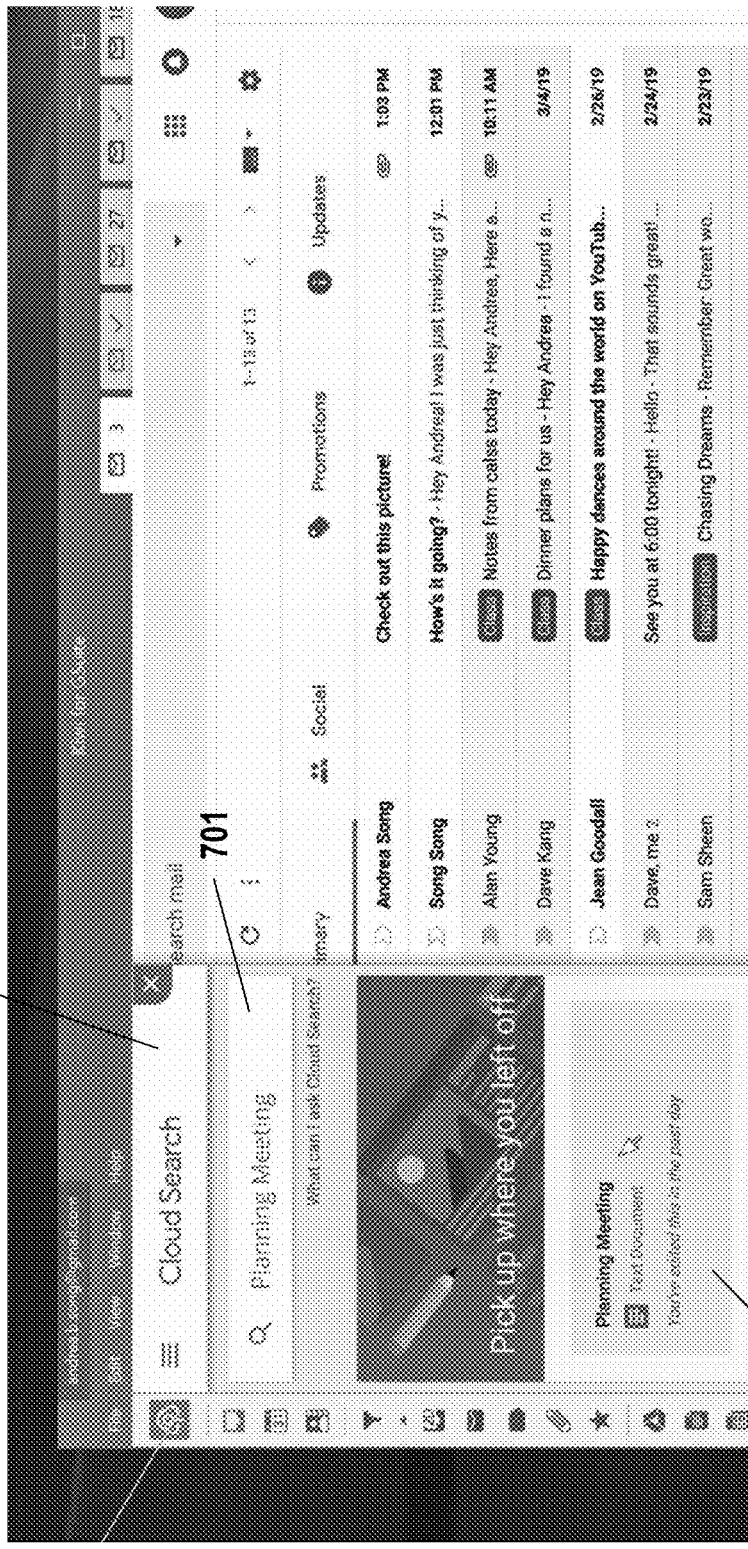
FIG. 7A illustrates an example of graphical user interface for cloud search.

The GUI provided herein may conveniently allow users to conduct cloud search from any current location/application by providing the cloud search features as an augmented feature of the GUI. This beneficially avoid requiring users to launch a cloud search website in order to conduct the search. FIG. 7A illustrates an example of GUI including a cloud search feature. As illustrated in the example, the cloud search feature 700 can be launched from any module of the desktop application. For instance, the cloud search feature may be presented as a graphical icon 700 in a left panel (side bar) of an email module. Upon user clicking on the graphical icon, a panel 705 of the cloud search may slide over the current window prompting the user to input the search string in a search box 701. The search can be applied to all of the cloud documents across multiple modules or applications. The search may be applied to all the cloud documents and/or content accessible to a user selected account. In the illustrated example, the search result 703 may be displayed within the panel 705 with a thumbnail. The user may click on the thumbnail of the search result to open the document. This may beneficially allow users to access document from a different application and perform search seamlessly across various applications from any current application/location.

Figure 7B:
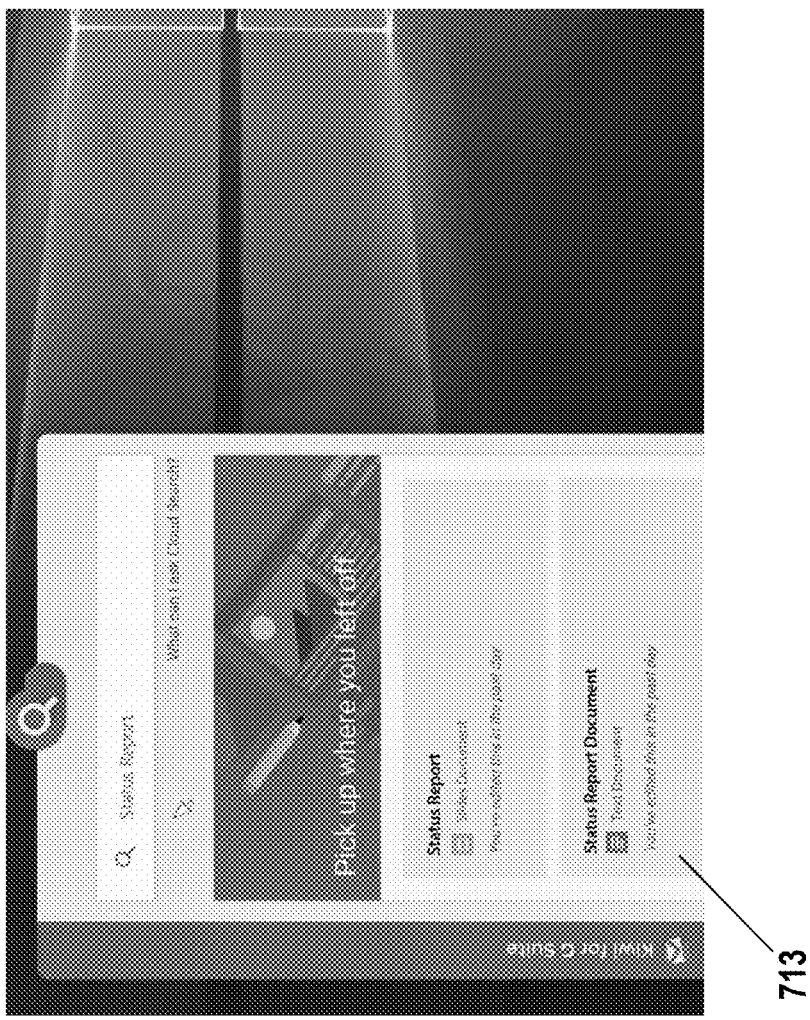
FIG. 7B and FIG. 7C show examples of a desktop cloud search feature.
Figure 7B:
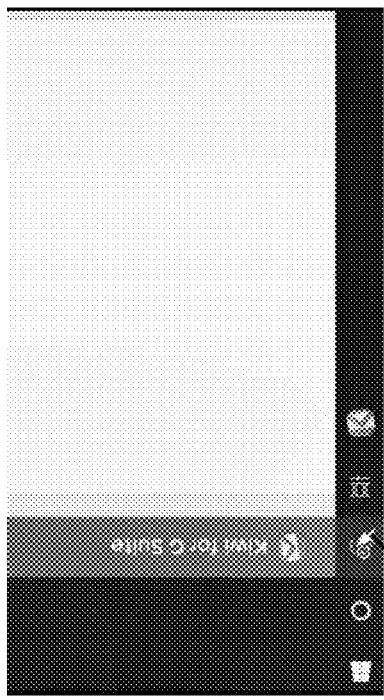
Figure 7C:
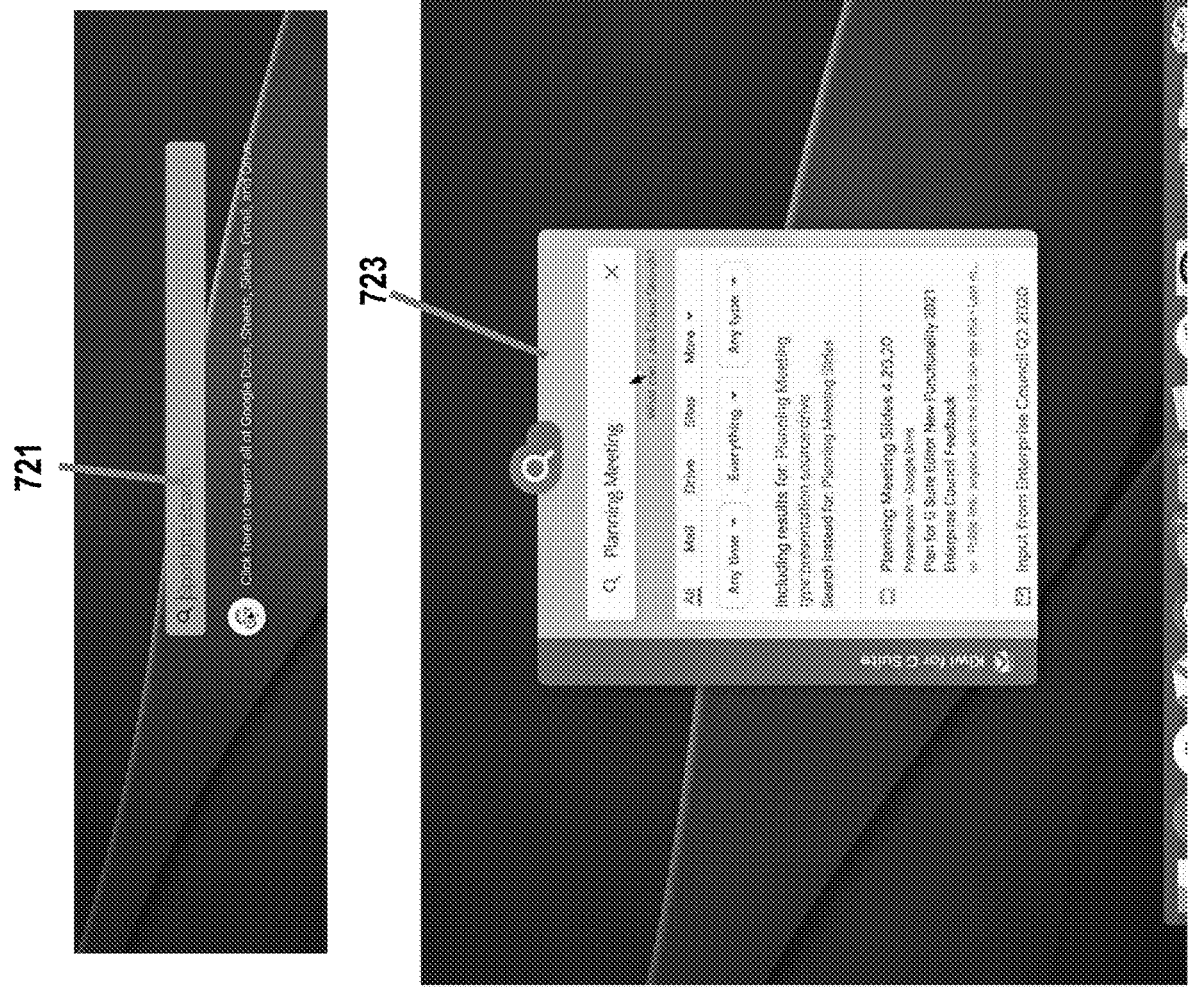

In some cases, the cloud search feature can be integrated to the operating system (e.g., Windows, Linux, Mac OS, iOS, Chrome OS, etc.). The cloud search feature may be configured to appear native to the operating system as a standalone desktop search feature. The process and method of providing the cloud search feature as a desktop application can be the same as described above. A user may launch the provided desktop search feature from an icon on the desktop, from an icon or button in the system's taskbar, or from accessing the application in the computer file system. FIG. 7B and FIG. 7C show various examples of the desktop cloud search feature. As shown in FIG. 7B, the cloud search feature 711 can be accessible through the taskbar like other desktop applications. A user may perform search and preview the search result within a desktop search window 713. The cloud search feature may allow users to quickly locate a wide variety of items on the cloud, including documents, pictures, music, applications, emails, and various others. FIG. 7C shows another example of the cloud search features 721 integrated to a different operating system (e.g., Mac OS or iOS). In the illustrated example, the cloud search function 721 may be provided alongside with a desktop search tool such as iOS embedded desktop search feature (e.g., Spotlight). A user may perform search and preview the search result within a window of the desktop search tool 723.

Figure 8:
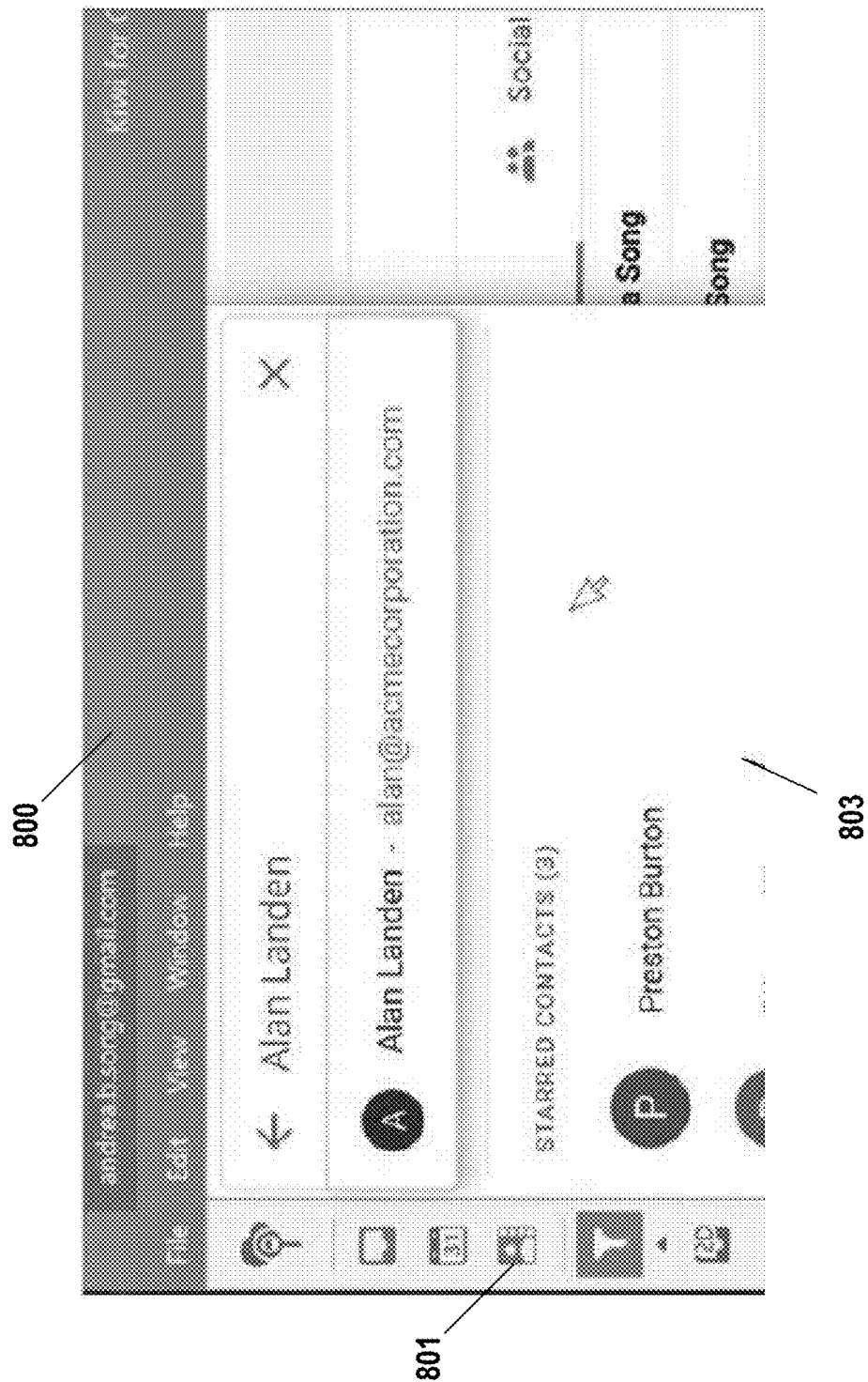
FIG. 8 shows an example of a contact search element integrated to an email application module.

FIG. 8 illustrates an example of a contact search feature 801 integrated to a mail application module 800. The contact search feature enables a user to type the name of a contact and find all emails from that contact, instead of using the web-based mail application's more complex field-based search feature to find such emails. The contact search function 803 may also be accessible from the panel and a user may seamlessly switch from the email operations to the operations provided by the contact module (e.g., call, email, etc.) 803.

Figure 9:
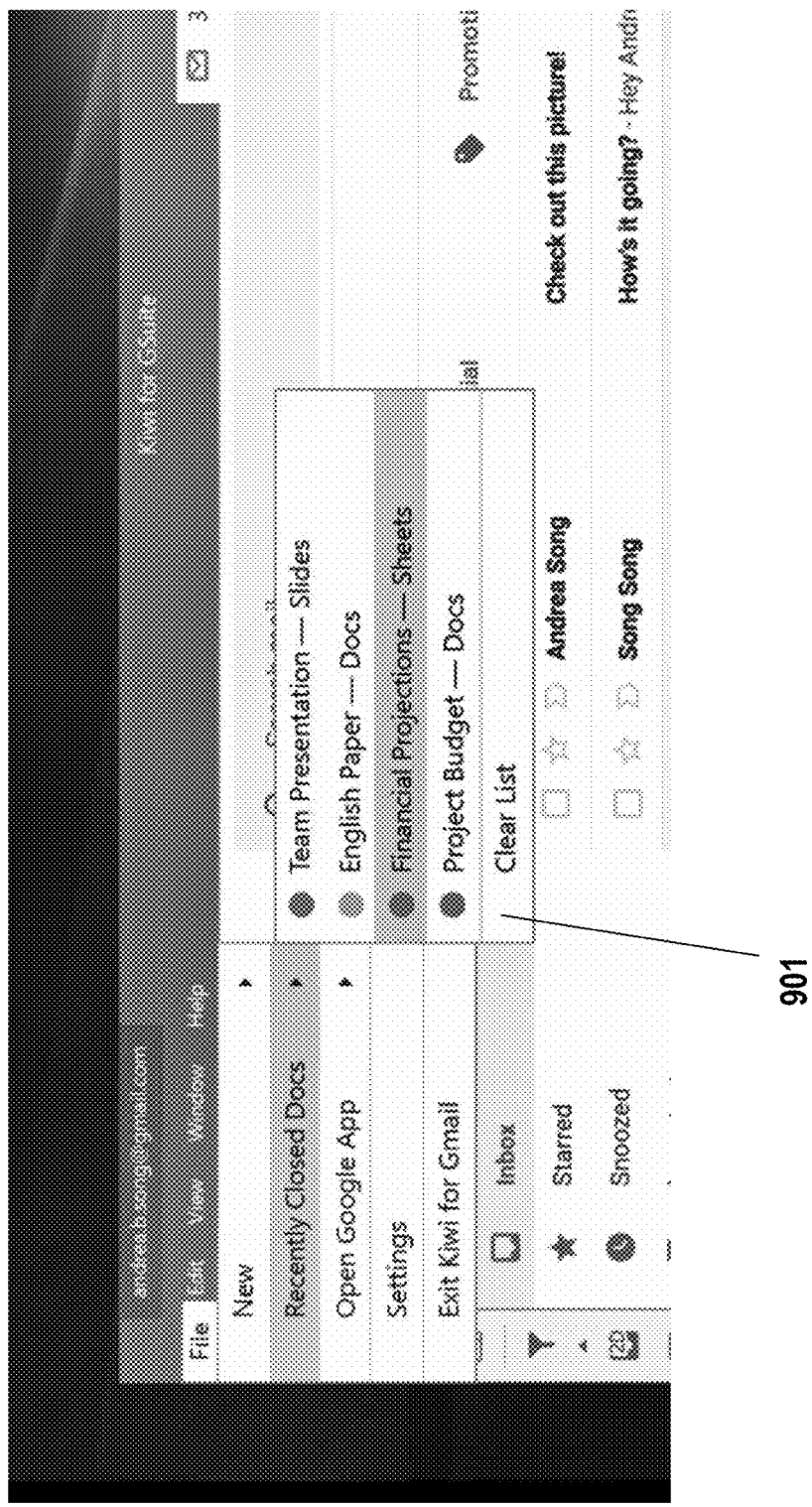
FIG. 9 illustrates an enhanced user interface for accessing recent documents.

The provided desktop application and/or the GUI may allow for global recent document search across multiple applications (e.g., Gmail, Docs, Drive, Calendar, etc.). FIG. 9 illustrates an enhanced user interface for accessing recent documents. The enhanced user interface uses the file menu 901, available in any current applications such as Gmail, to enable users to access recent documents across different applications (e.g., Slides, Docs, Sheets).

The provided desktop application and/or the GUI may provide a plurality of focused filtering functions to the email application. The focused filtering functions may allow users to apply filtering to the emails across multiple search dimensions such as date, importance of email, attachment and the like.

Figure 10A:
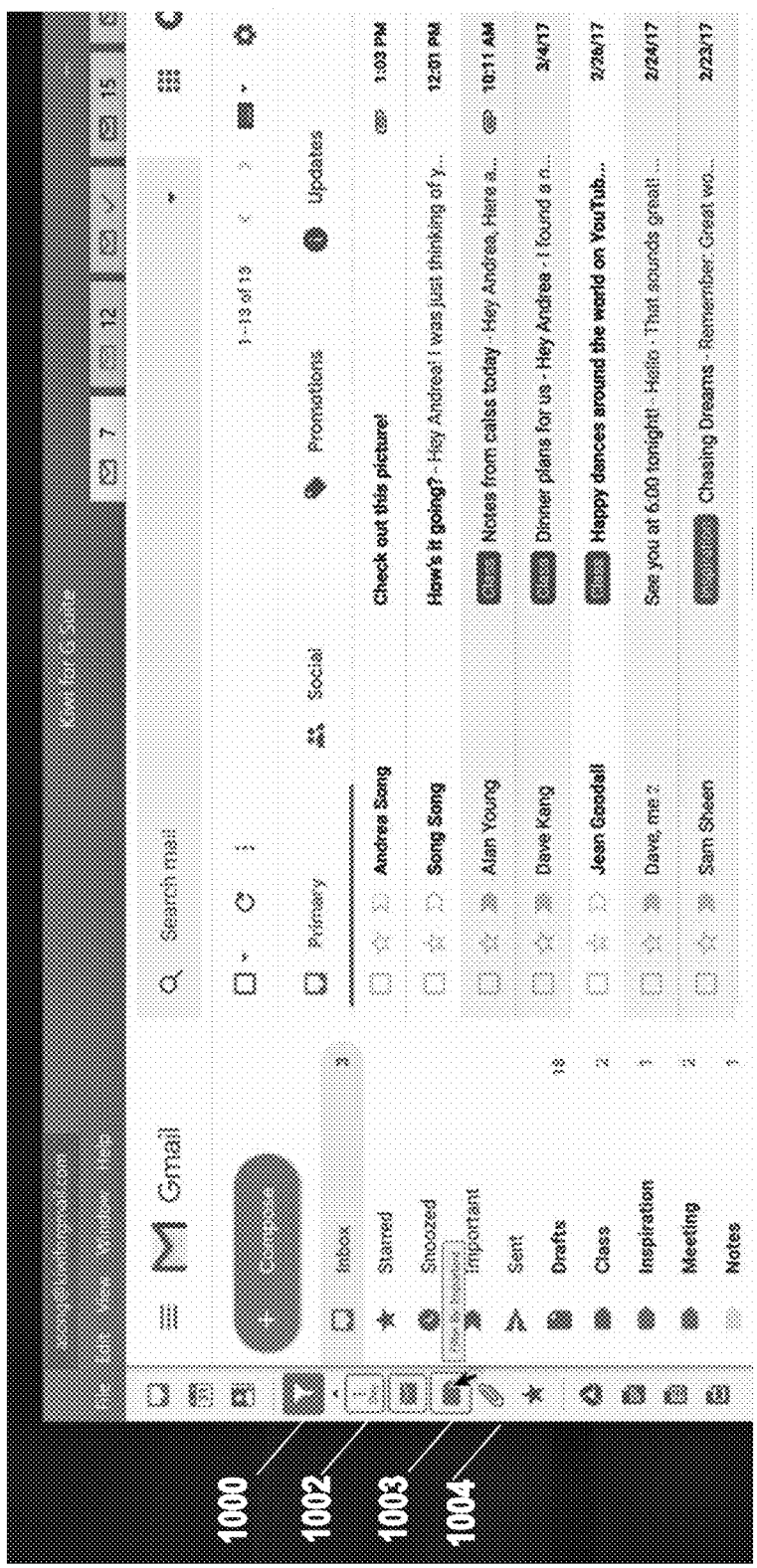
FIG. 10A shows an example of filtering features provided to a Gmail module.

FIG. 10A shows an example of filtering features provided to the Gmail module. In the email view, the filtering feature 1000 is provided in the panel as a graphical icon (e.g., funnel icon). A plurality of filtering options can be nested under the filtering feature. For example, a user may select filtering operations from filter by day 1001, recent emails, importance of email 1002, attachment 1003 and the like.

Figure 10B:
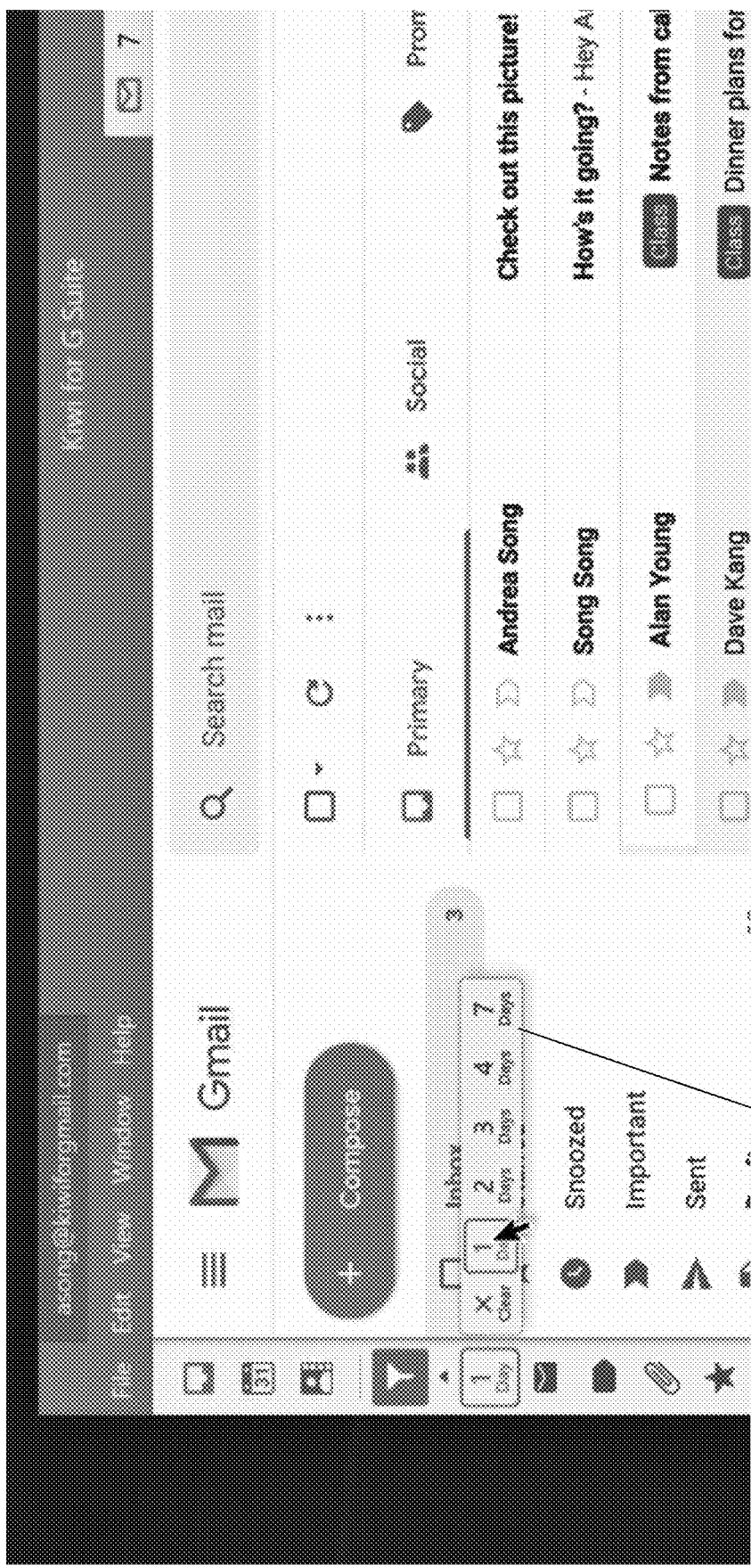
FIG. 10B shows an example of filtering email by recent days.

FIG. 10B shows an example of filtering by recent days. Upon clicking on the Day icon 1001, a menu including a set of recent days options 1010 are displayed. A user may then filter the emails by the recent one day, two days, three days and the like.

Various other powerful features such as automatic restoration of the application when the computer is restarted are also provided. The application may perform workspace recall to bring users back to where they left off. Additionally, one or more of the desktop applications may be automatically launched upon a user trigger. For instance, the desktop email (e.g., Gmail) module can be set as the default email application on the user's computer, and when a user clicks on an email address hyperlink (via a browser), the desktop email application may be automatically launched for composing a new email. In another example, any local documents can be shared via the desktop applications (e.g., email module, drive, etc.) by a user action (e.g., right click on the document).

Figure 13:
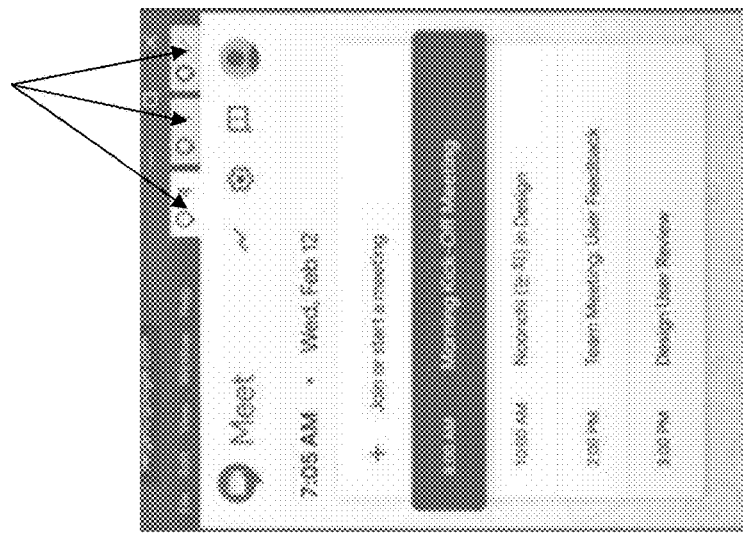
FIG. 13 shows a home screen of a desktop-based video conferencing tool.

The desktop application may provide a video conferencing tool (e.g., Meet, Hangout, etc.). FIG. 13 shows a home screen of the video conferencing tool. The home screen may allow a user to start a new meeting or join an existing meeting on the user's calendar (e.g., "Morning Kick-Off Meeting"). The home screen may also allow a user to seamlessly switch between various video conferencing accounts (e.g., a work account and a personal account) by clicking on icons 1305 corresponding to the different accounts. Each icon may be associated with a particular account. The icons may be color-coded (e.g., green for a work account and red for a personal account).

Figure 11A:
FIG. 11A illustrates enhancement features enabled by the provided application to a web-based video conferencing platform.
Figure 14:
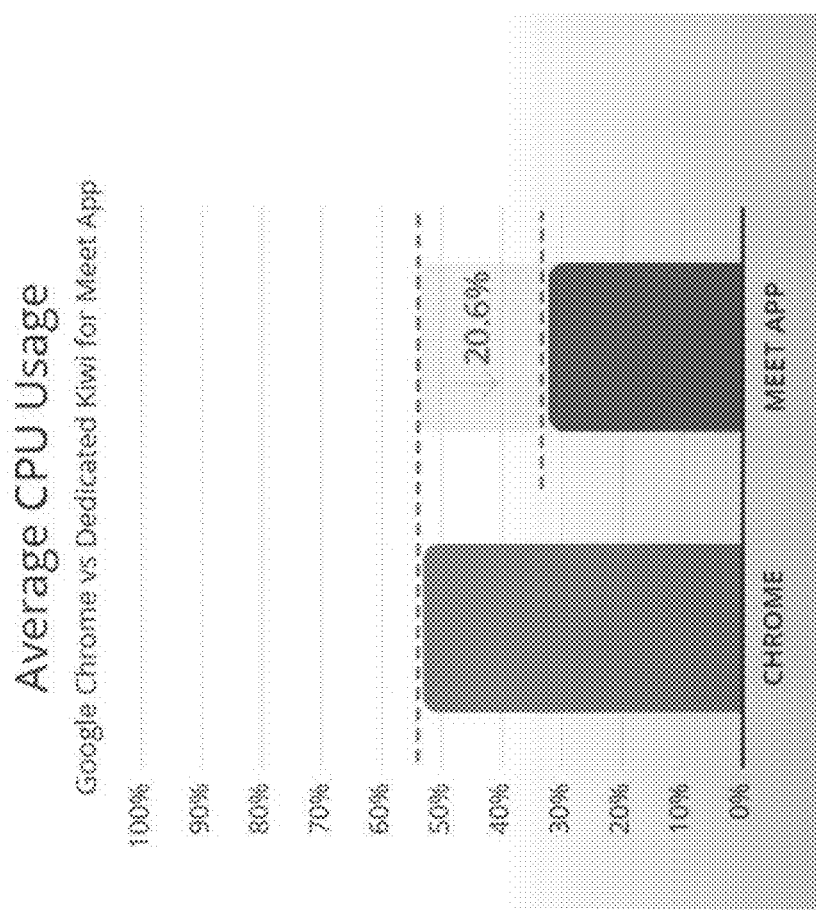
FIGS. 14 and 15 show performance characteristics of the desktop-based video conferencing tool.
Figure 15:
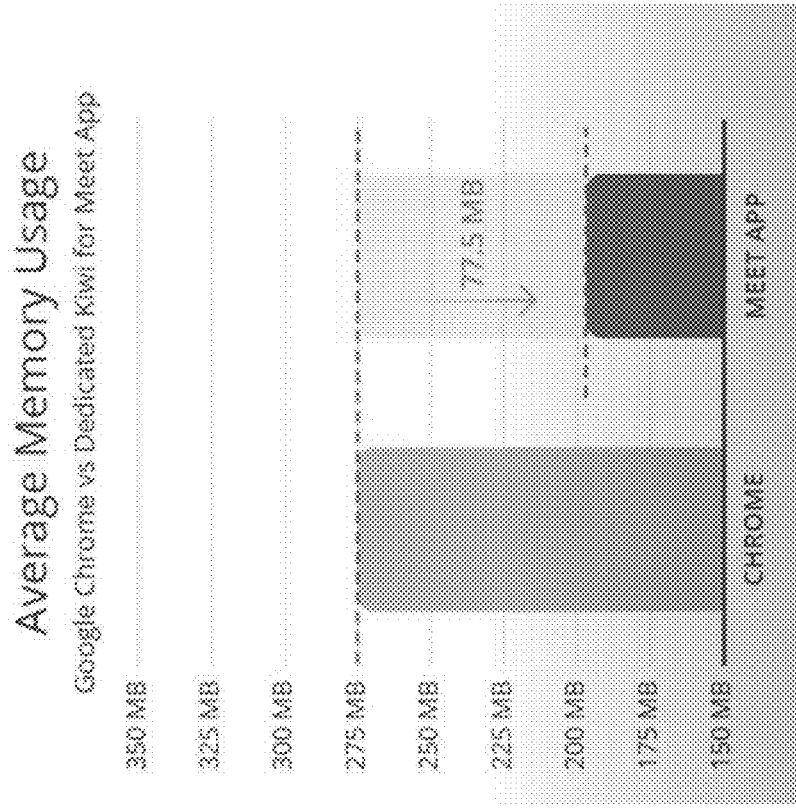

FIG. 11A shows a meeting window 1101 of the video conferencing tool. The video conferencing tool may be a web-based application rendered in a fashion that is native to an operating system. For example, the meeting window may be displayed directly on the user's desktop outside of a browser. The meeting window may appear directly on the desktop without window frame or title bar. By operating directly on the desktop rather than through a browser, the video conferencing tool may use 20.6% less CPU resources on average (FIG. 14) and 77.5 MB less memory on average (FIG. 15). To achieve these performance gains, the desktop-based video conferencing tool may run a limited user interface. Additionally, by running on the desktop, the video conferencing tool may not include extension subsystems, and the features in the video conferencing tool may be limited to just the renderer of the video conferencing tool (e.g., the Meet renderer). In summary, the gains may result from the application allowing use of all of its resources to focus on the Meet renderer, rather than having to share across many systems and other rendered web applications.

The user can launch the meeting window directly from his desktop (e.g., from the home screen of the video conferencing tool) or from a browser link. The meeting window may offer improved display options and flexibility in configuring its appearance. For instance, the meeting window may allow a user to pin the window at any location on the desktop using button 1103, make the window the top window on the desktop using button 1105, or make the window larger or smaller using buttons 1107.

Figure 11B:
FIG. 11B shows an example of a participant bar and appearance of a video conferencing application.

In some cases, at least a portion of the meeting window may be invisible or transparent to save visual space on the desktop. For instance, the graphical user interface may allow a participant bar and functional buttons to appear on the desktop, whereas other meeting window elements are invisible. In some cases, some visual components such as the participant bar, functional buttons, speaker window, and the like, can be disassembled and can be individually placed in any location on the desktop. FIG. 11B shows an example of a participant bar. The participant bar is displayed as a desktop feature 1109 and the video conference window is invisible. The functional buttons may also be displayed as desktop graphical elements for easy control. This may beneficially allow for an optimized display of the visual elements on the desktop. For instance, other documents or content can be arranged in a location without overlapping with the visual elements that a meeting window may have. In some cases, the video conferencing tool may have an eye contact feature. The eye contact feature may detect speech originating from a particular video feed and automatically move the corresponding video feed window to a location on the desktop (e.g., directly below the camera) that facilitates eye contact with the speaker.

Figure 16:
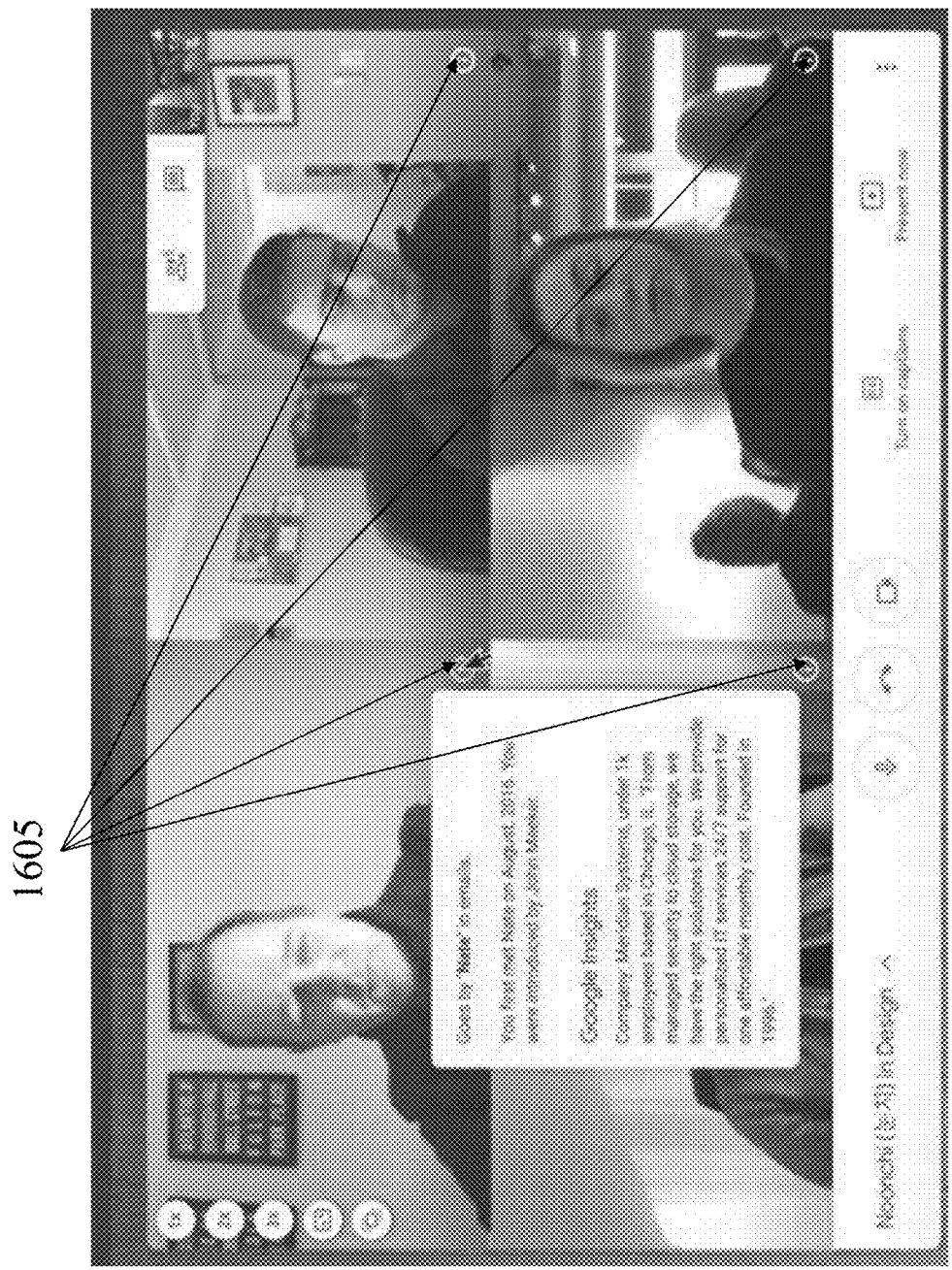
FIG. 16 shows a people assistant feature of the video conferencing tool.

The video conferencing tool may have an integrated "People Assistant" feature. The People Assistant feature may provide rich information about the participants in a video conference. FIG. 16 shows one implementation of the People Assistant feature. Each participant's video feed window may have an information button 1605. The user can click on a respective information button to reveal a pop-up window with information about the corresponding participant. The pop-up window may include, for example, information about the participant's preferred name or nickname, how and when the user met the participant, the participant's employer and job title, the participant's location, and the like. In some cases, the video conferencing tool can additionally obtain relevant information from the Internet. For example, the video conferencing tool can obtain high-level information about the participant's employer and include such high-level information in the pop-up window. Such information can facilitate a more informed conversation between the participant and the use.

Figure 17:
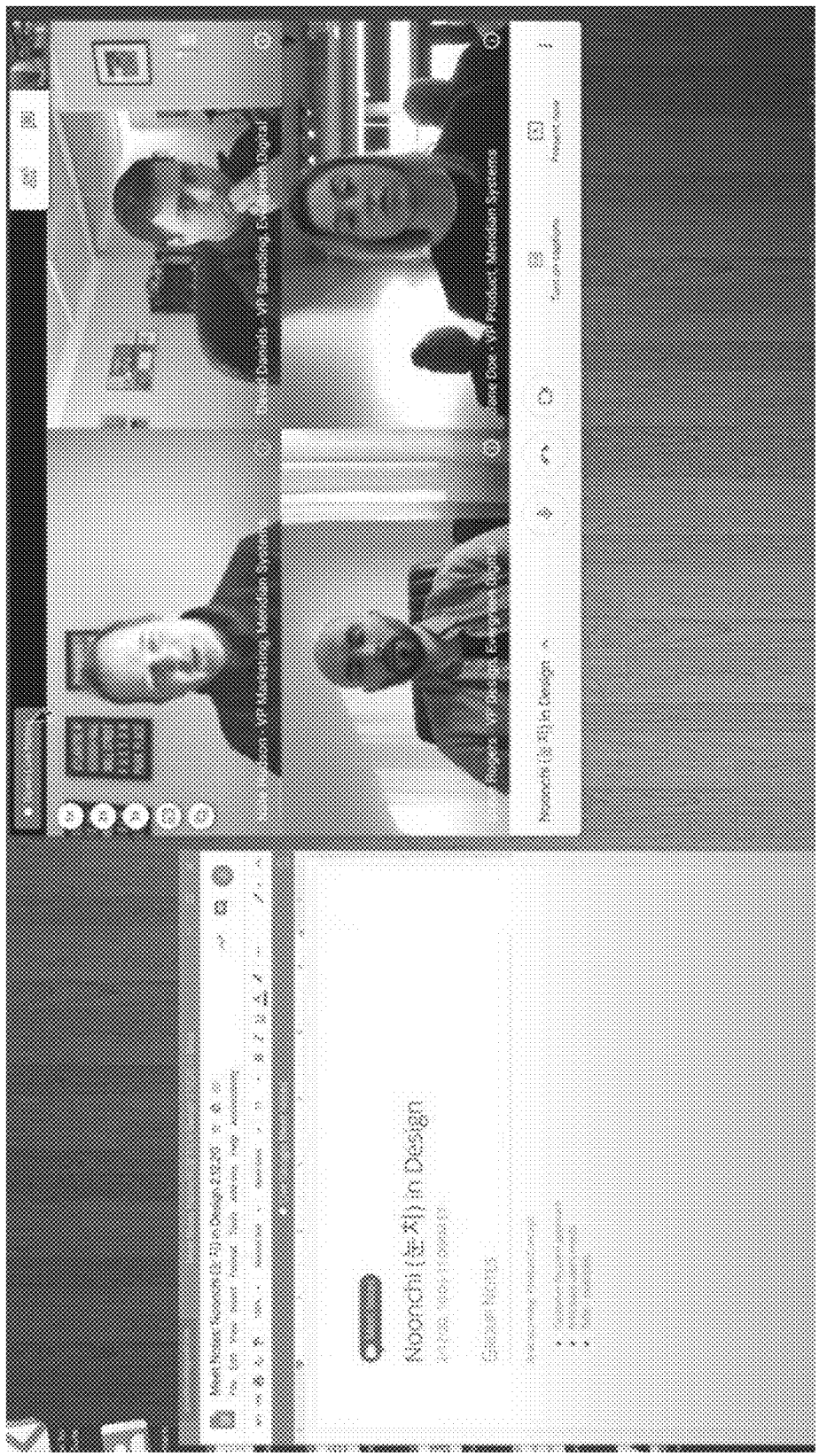
FIG. 17 shows a meeting notes feature of the video conferencing tool.

The video conferencing tool may have a note-taking feature. The host of a video conference, or any other participant, can create a meeting notes document (e.g., a Doc) by selecting a button in a menu in the meeting window. Creating the meeting notes document may automatically share the document with all video conference participants. For example, an "Open Live Notes" button may appear on each participant's instance of the video conferencing tool upon creation of the document. A participant can access the document by clicking on the button, which may cause the document to appear adjacent to the meeting window as depicted in FIG. 17. The meeting notes document may serve as a live, multi-user whiteboard for the participants of the video conference. The meeting notes document may additionally have a "Personal Notes" section that is visible only to the user. In some cases, users may have the option to create entirely separate personal notes documents.

The note-taking feature may have an outlining feature that automatically tags various sections and sub-sections within the document as notes are added to the document. The note-taking feature may also add certain sections to the document automatically. For example, it may add a section containing the names of the participants, the date and time of the meeting, the chat transcript associated with the meeting, a recording of the meeting, and the like.

In some implementations, the organizer or host of the meeting can choose who receives a copy of the meeting notes document after the meeting. For example, the organizer or host can choose to share the document with all participants, participants within the organizer's company, or select individuals. In some implementations, the note-taking feature may retrospectively attach the meeting notes to the calendar event tied to the meeting so that all participants can easily find and access the meeting notes.

The video conferencing tool may have a contact assistant tool. The contact assistant tool may utilize machine learning techniques to extract contact insights (e.g., location) based on past communications. For example, the contact assistant tool may predict an identity of a participant based on limited information such as phone number, area code and the like. In some cases, participants may call into a video conference with an unknown phone number. In such cases, the contact assistant tool may infer the name of the participant associated with the phone number. In one example, the contact assistant tool can infer the name of a participant associated with a phone number through process of elimination (e.g., because every other participant in the video conference has been identified). In another example, the contact assistant tool can infer the name of a participant associated with a phone number by cross-referencing the phone number with information from the user's contacts or emails (e.g., signature lines of emails from contacts).

In some cases, the contact assistant tool may not be able to determine certainty of an identity associate with a phone number or identify an identity that should not be permitted to attend the meeting. For instance, the contact assistant tool can generate a warning or alert that indicates that the number is unidentified and that the corresponding participant may not have been invited.

Tabs

Figure 18:
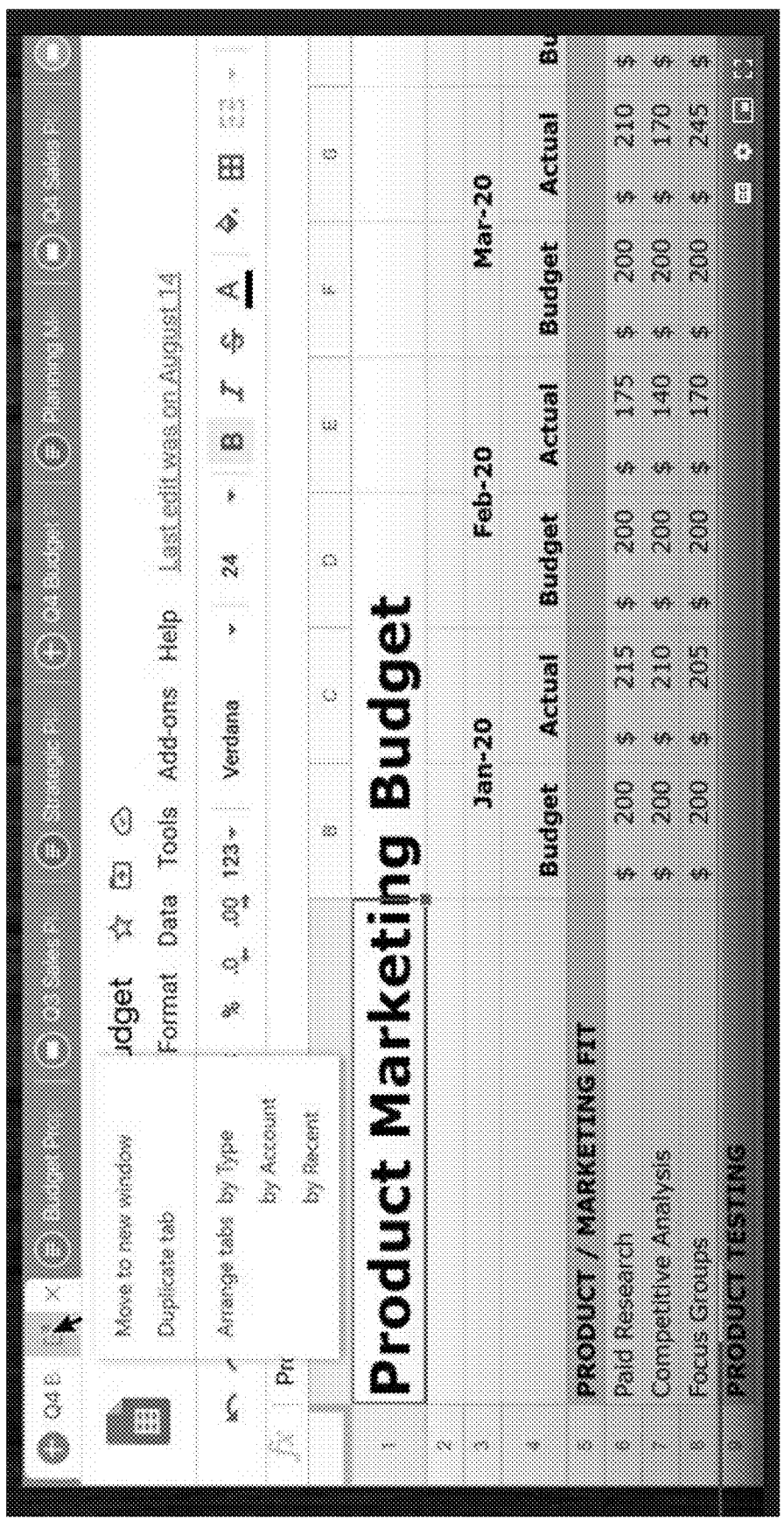
FIGS. 18-23 show tab functionality of an application.

The desktop application may allow a user to open multiple tabs in a single window. Each tab may correspond to a different document or object (e.g., G-Suite object) as shown in FIG. 18. A particular tab may show the name of the document and an icon that indicates the document type (e.g., Doc, Sheet, Slide). In some cases, the tabs may be color-coded according to the particular account with which the document is associated, as shown in FIG. 18. In other cases, the tab bar may be color-coded according to the document type of the document that is currently open (e.g., green if a Sheet). The use of a single, tabbed window rather than multiple windows may reduce desktop clutter and improve user workflow.

The desktop application may have powerful tab functionality. A user can access the tab functionality by right clicking on a tab or by hovering over the tab and clicking on the tab button that appears, as shown in FIG. 18. The user can then move the tab to a new window, duplicate the tab, or arrange the tabs in the window by document type, account, or time of last edit (e.g., "Recent"). When a tab is moved to a new window, the desktop application may automatically resize the window. For example, it may make a Doc long and narrow, a Sheet wide and short, or otherwise conform the size to the layout of the particular document.

Figure 19:
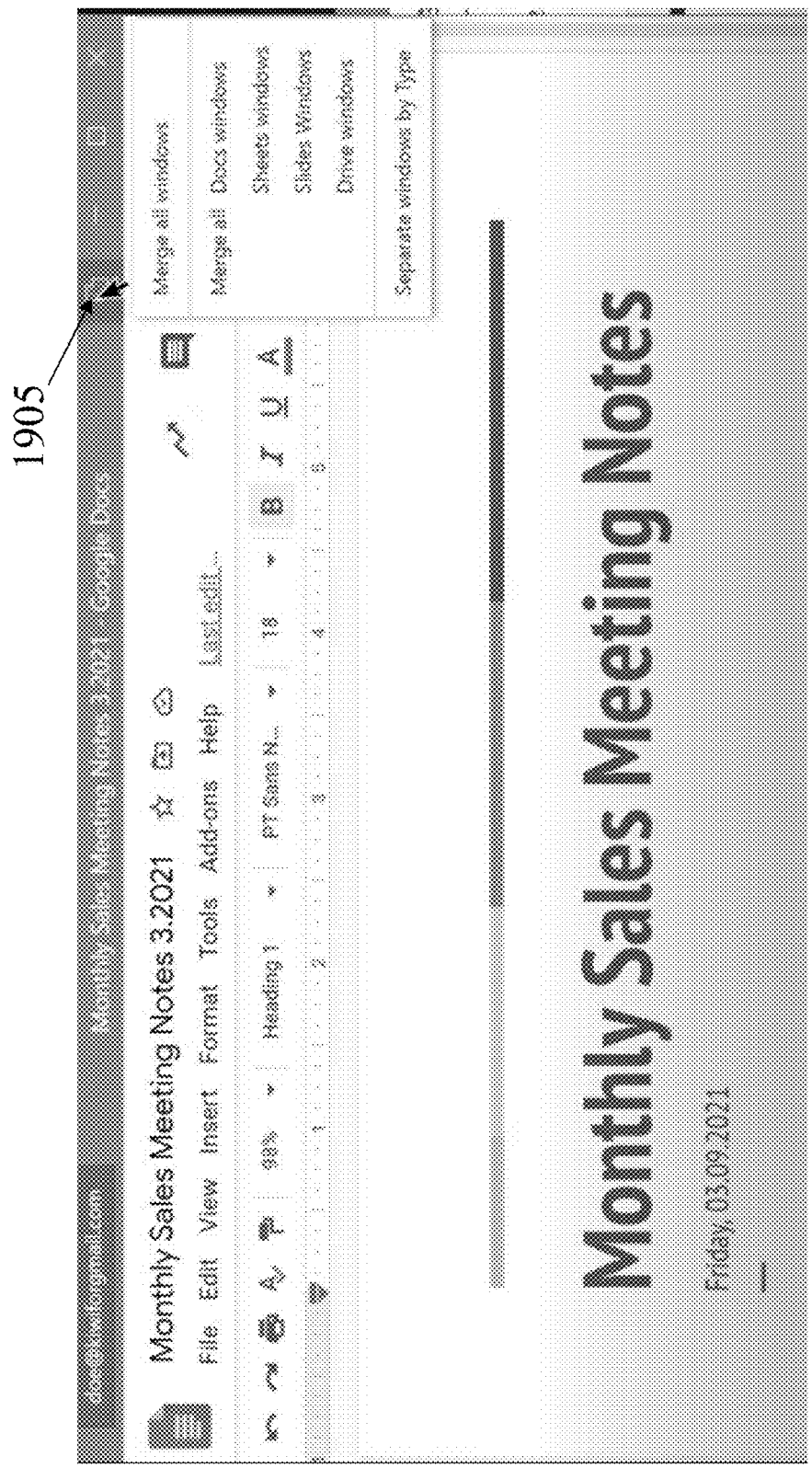

FIG. 19 shows additional tab functionality that is accessible through a document window. A user can access such additional tab functionality by clicking on a button 1905. Thereafter, the user can merge all windows into a single, multi-tab window, merge all document windows of a particular type or all Drive windows into a single window, or separate a single, multi-tab window into multiple windows containing tabs with a single document type.

Although the tab functionality described above was described in the context of a desktop application, it can also be implemented in a web browser.

Figure 20:
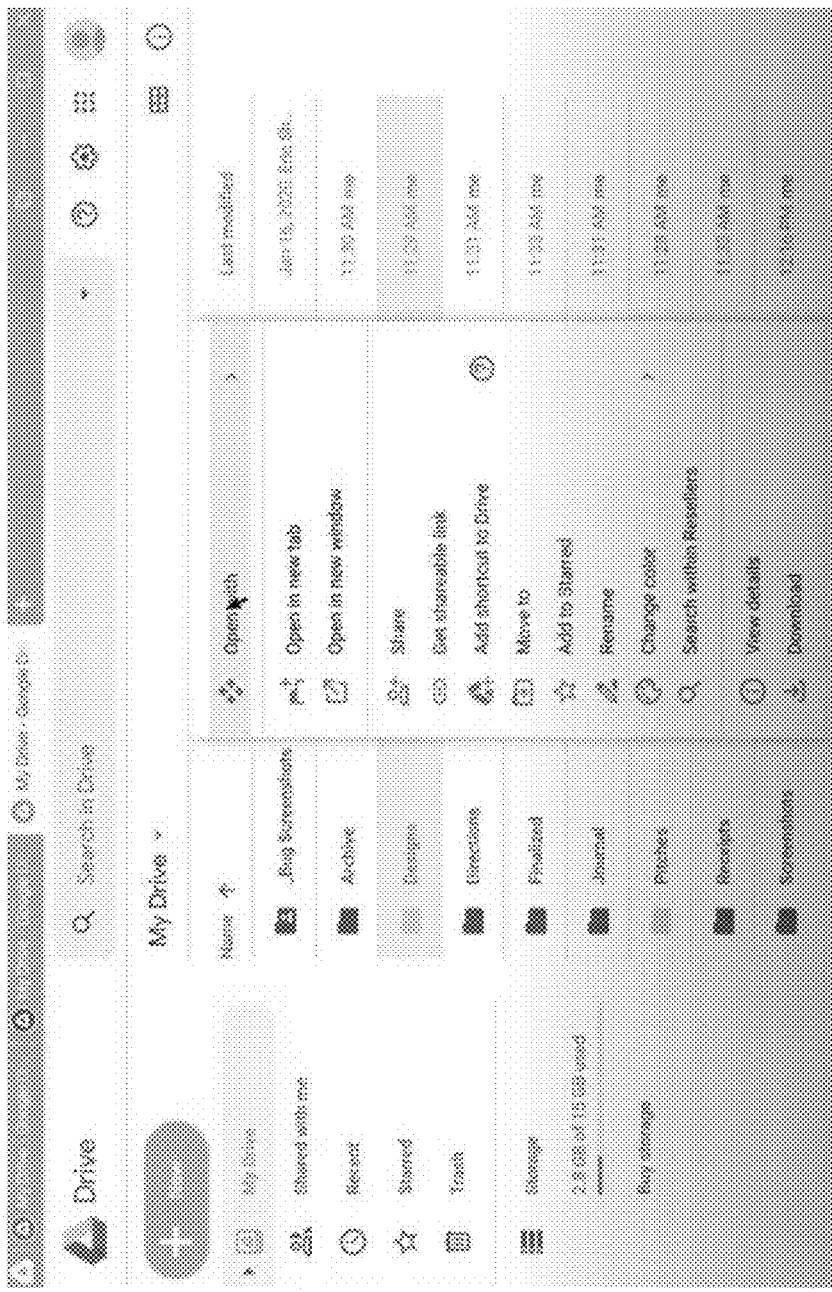
Figure 21:
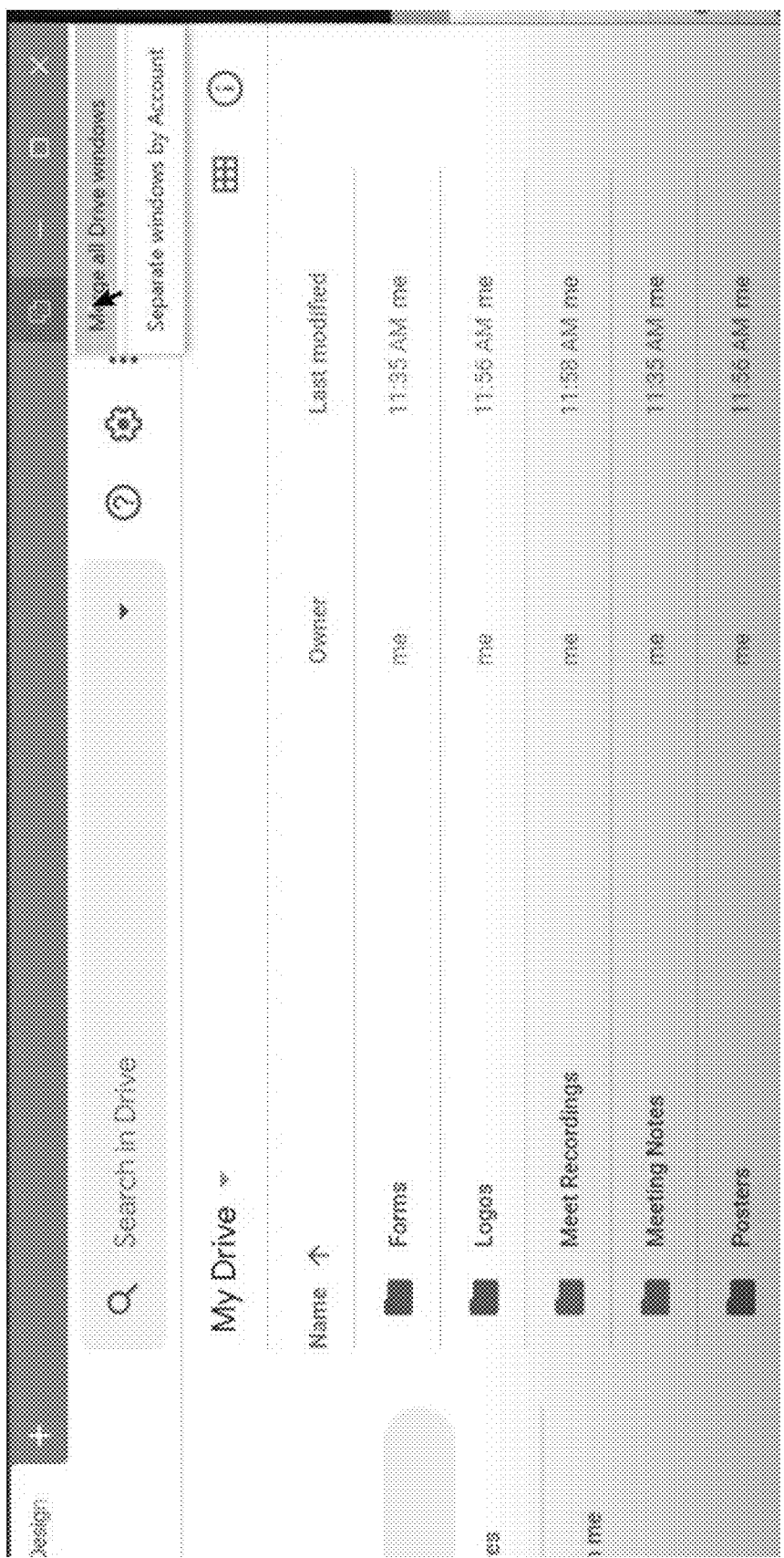
Figure 22:
Figure 23:
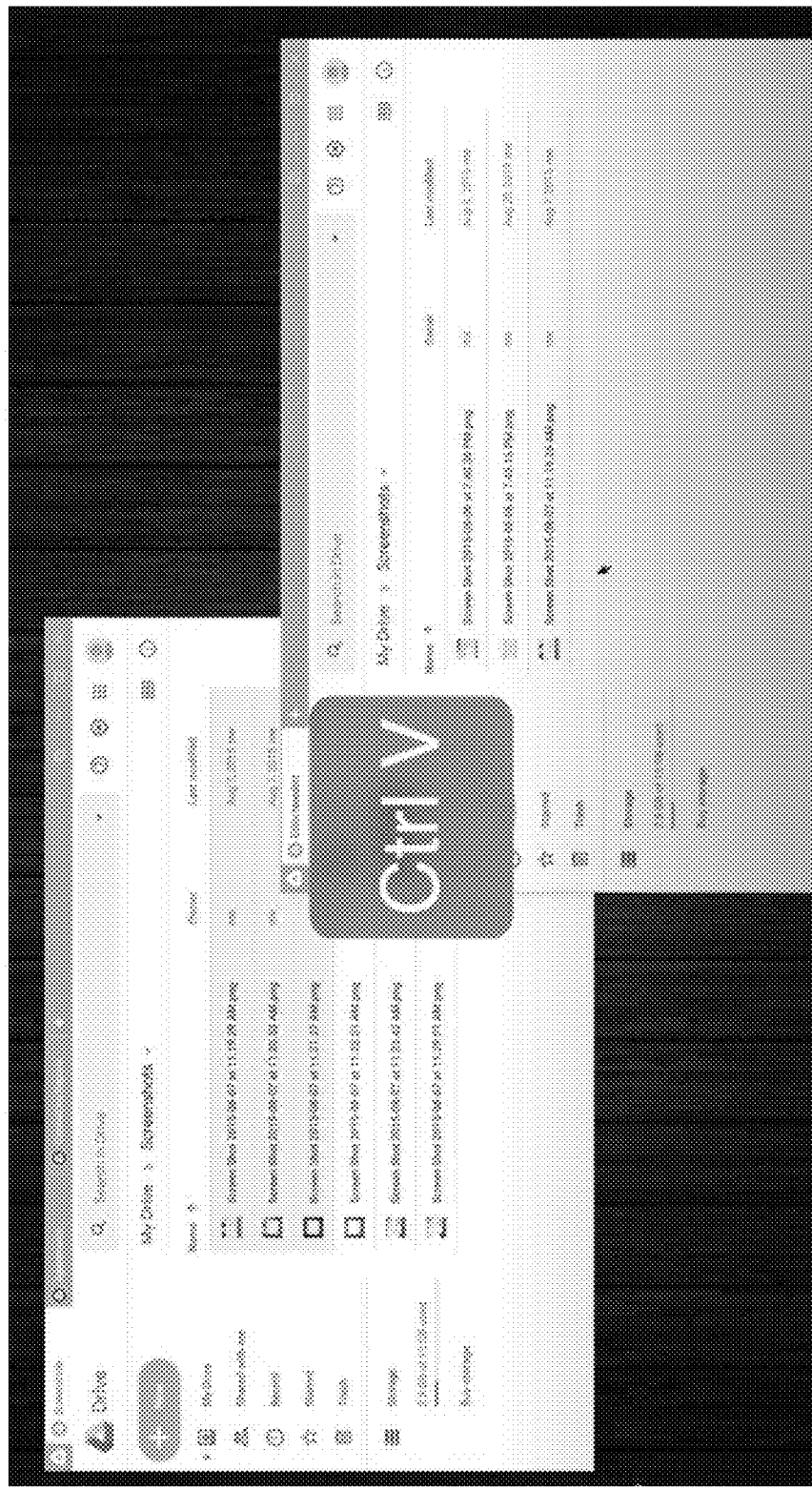

The desktop application may have a feature-rich file system with additional tab functionality. FIG. 20 shows that a user can open a folder in a new tab or a new window by right clicking on the folder and selecting the appropriate option from the drop-down menu. FIG. 21 shows how a user can merge all file system windows (e.g., Drive windows) into a single, multi-tab window, or separate file system windows by account. The desktop application may allow a user to select and drag files from one folder to a tab corresponding to a different folder as shown in FIG. 22, and it may allow a user to copy and paste files from one window to another as shown in FIG. 23. In some cases, the functionality shown in FIG. 22 and FIG. 23 may be limited to folders within the same account. Tabs corresponding to folders from different accounts may be dimmed when a user begins to drag files, which may discourage the user from trying to move those files into those folders.

Figure 24:
FIG. 24 shows a folder pin function of a file system of an application.
Figure 25:
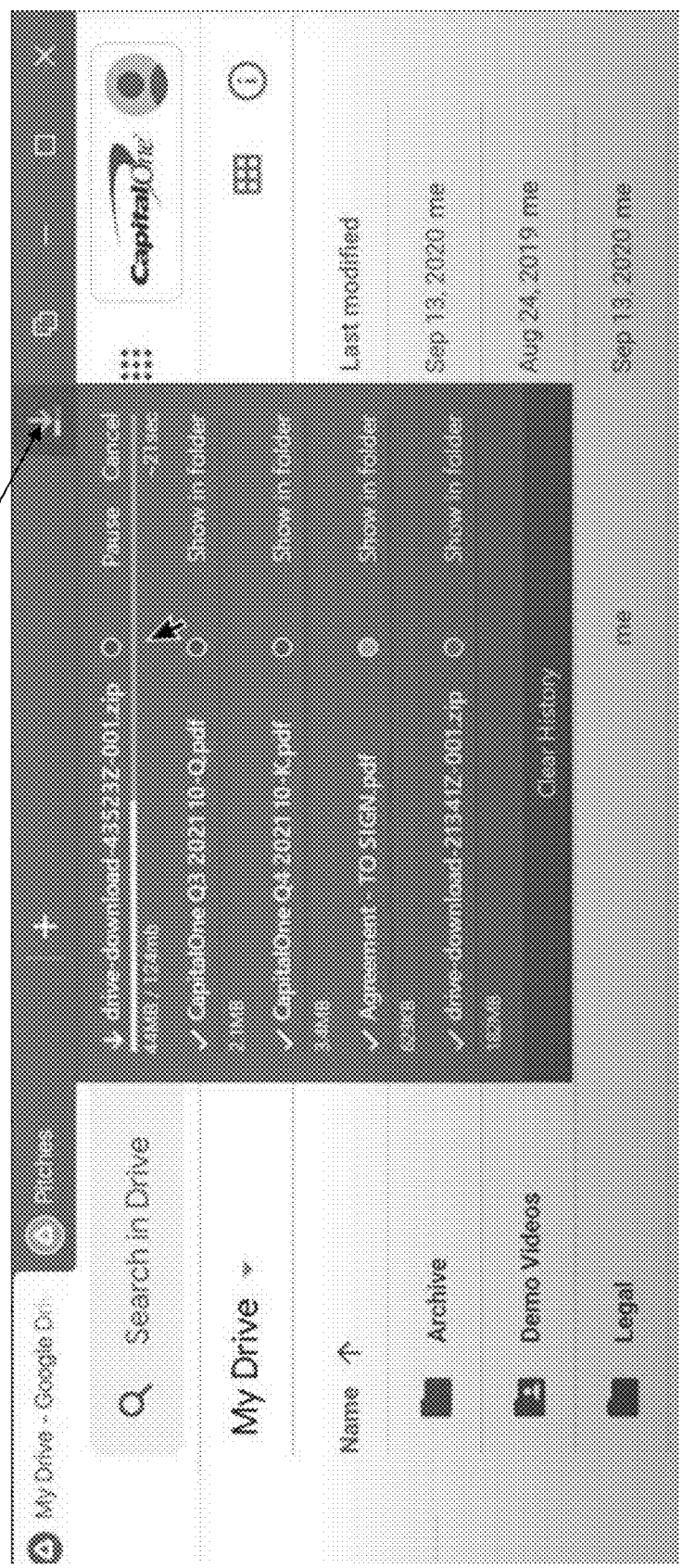
FIG. 25 shows a download manager of an application.

FIGS. 24 and 25 show additional functionality of the file system of the desktop application. FIG. 24 shows a folder pin function. A user can pin an important folder to the left-hand menu by clicking and dragging the folder to the left-hand menu. This may make the folder easily accessible in the future. FIG. 25 shows a download manager. When a user downloads a file from the file system, an icon 2505 may appear. The icon 2505 may have a download arrow and a download progress bar. Clicking the icon 2505 may reveal the download manager, which may show all files that were recently downloaded.

Workspaces

Figure 26A:
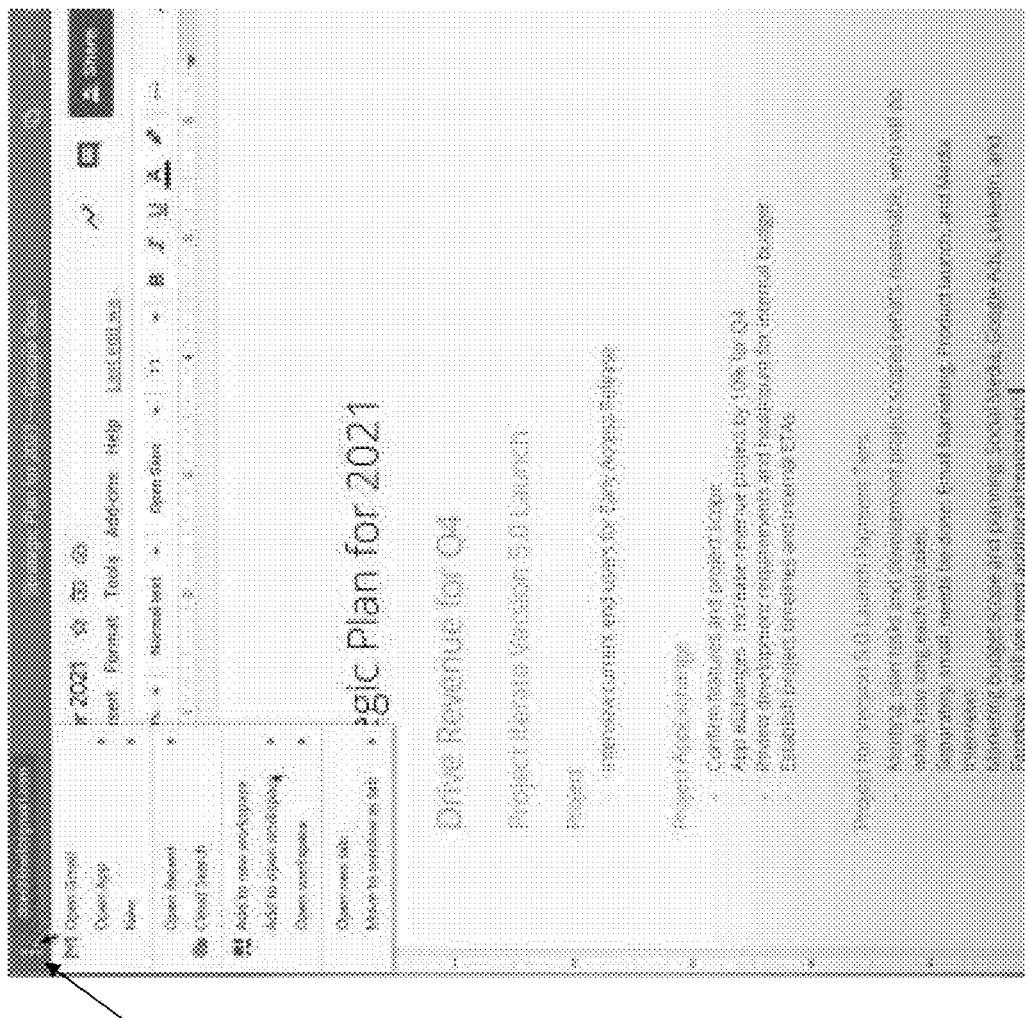
FIGS. 26A-C show workspace functionality of an application.
Figure 26B:
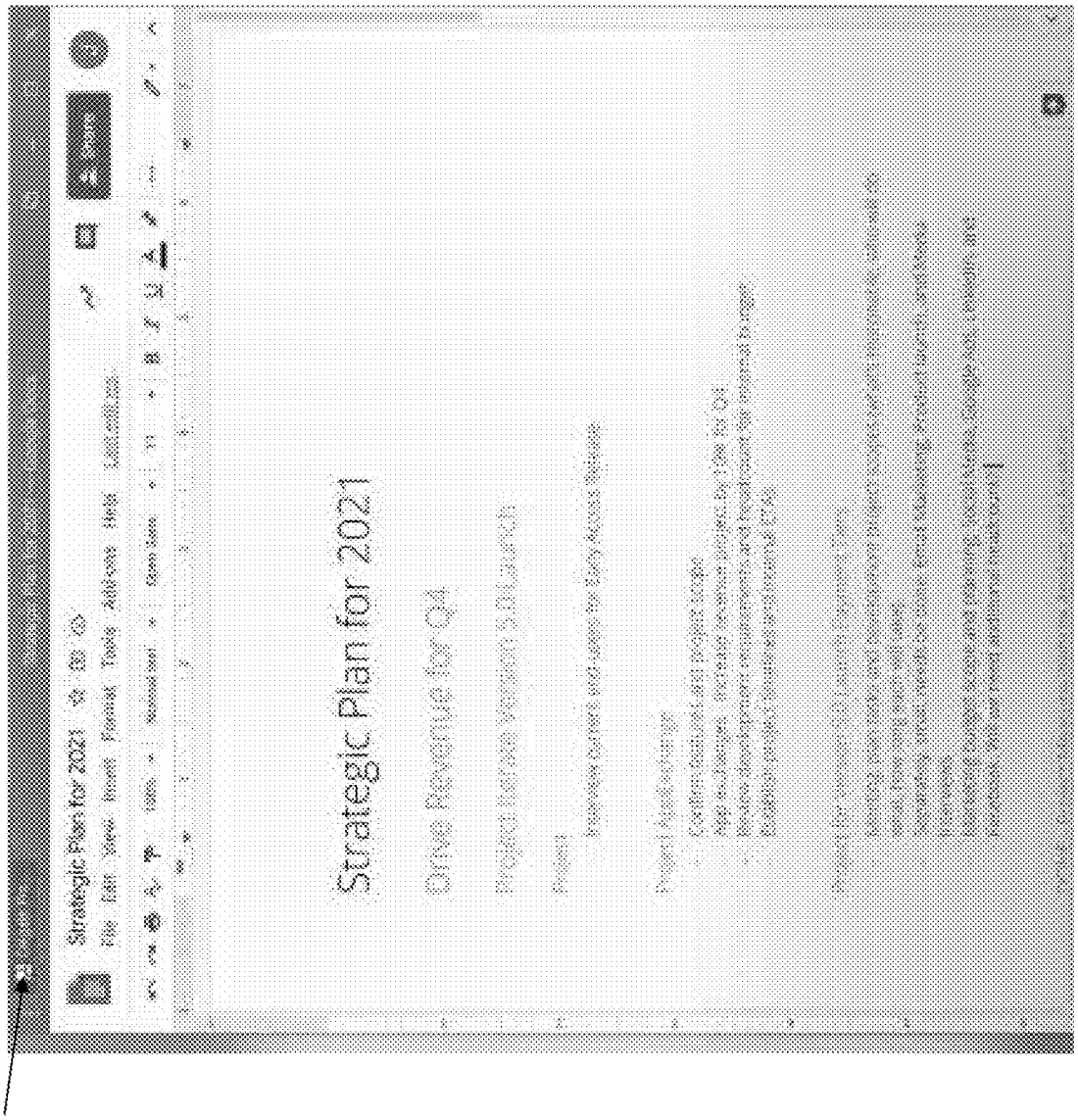
Figure 26C:
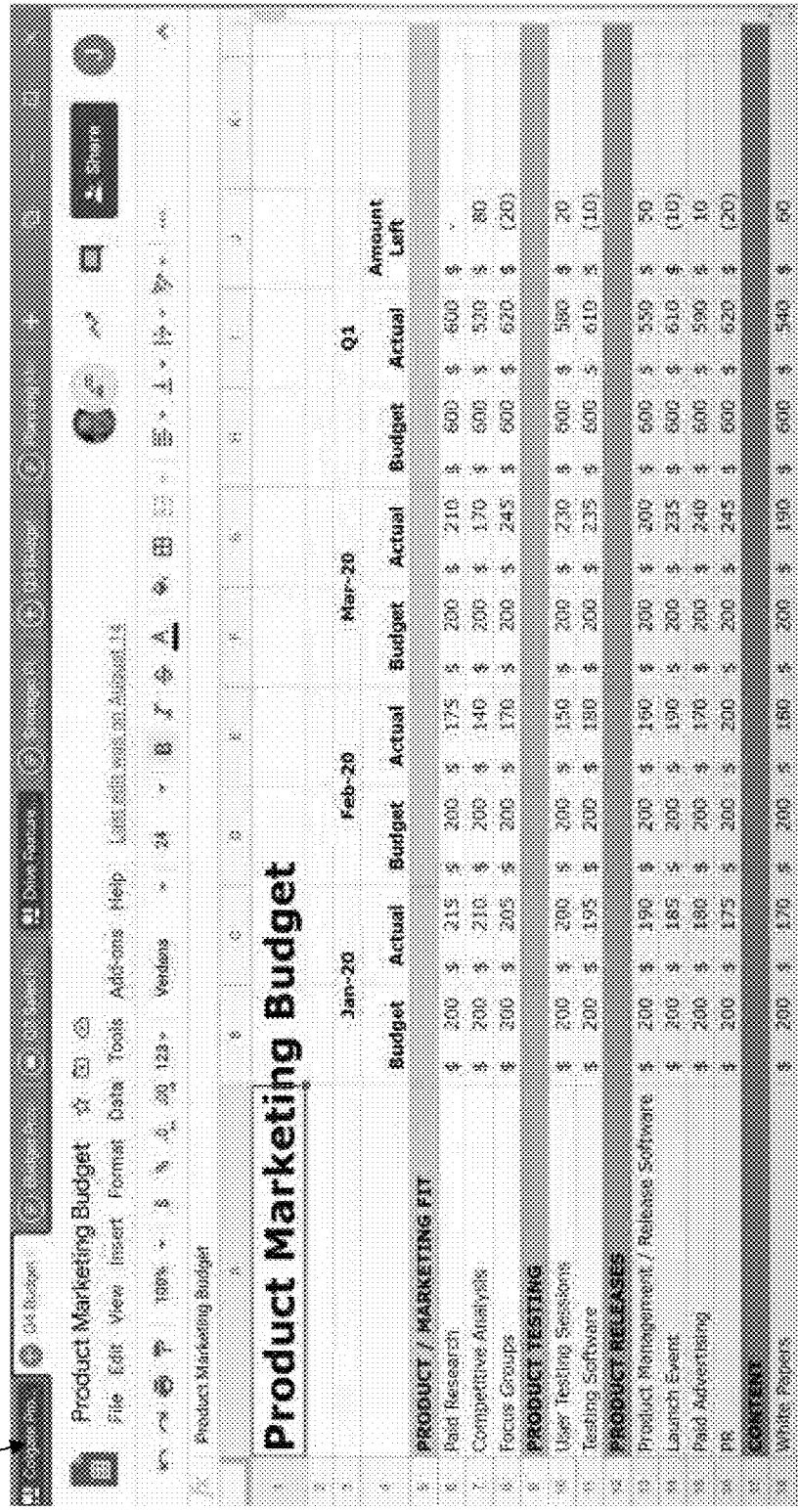
Figure 27:
FIGS. 27-29 show workspace functionality of an application.
Figure 28:
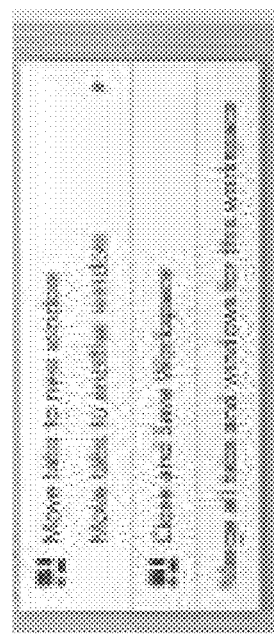

The desktop application may support the creation, editing, and recall of "workspaces," which are collections of related windows and tabs. FIG. 26A shows how a user may add a window to a new or existing workspace. The user may click on a button 2605 to reveal a drop-down menu. In the drop-down menu, the user may choose to add the window to a new or existing workspace. FIG. 26B shows the window of FIG. 26A after it has been added to a workspace named "Colgate Pro . . . ". An indicator 2610 appears on the window to show that it has been added. The indicator 2610 may have a workspace icon and the name of the workspace. FIG. 26C shows a separate window with a group of four tabs that are also in the "Colgate Pro . . . " workspace. A user can add a tab to a workspace by right-clicking on the tab to reveal a drop-down. Such a drop-down menu is depicted in FIG. 27. Meanwhile, FIG. 28 shows a drop-down menu that may appear when a user clicks on the workspace indicator 2610 or 2615. The drop-down menu may allow the user to close and save the workspace. Saving the workspace may involve saving the state of every window and tab in the workspace, including each window and tab's current content, size, and placement on the desktop.

Figure 29:
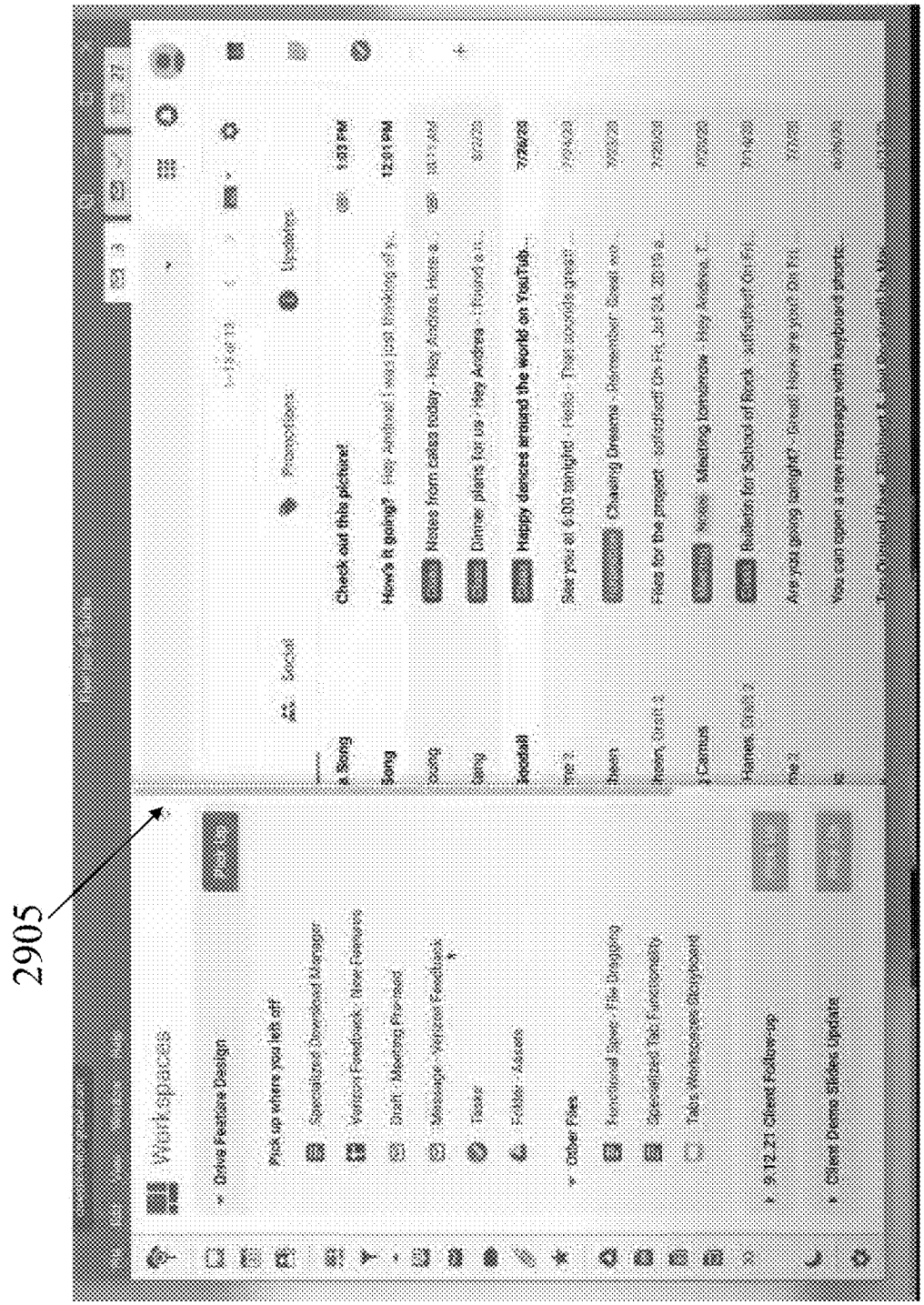

FIG. 29 shows a workspace panel. The workspace panel may show each of a user's saved workspaces. Each workspace may show the tabs and windows that were open on the user's desktop when the workspace was last open. Each workspace may also show the files in the workspace. To recall a workspace, a user can click on the "Pick Up" button. Recalling a workspace restores the tabs and windows in the workspace on the user's desktop. The recalled tabs and windows may have the same state (e.g., size and location) that they did when the workspace was last open. A user can edit a workspace (e.g., edit the tabs and windows in the workspace) by clicking on the button 2905, which may reveal a drop-down menu that allows editing.

Although workspaces were described in the context of a desktop application, workspaces may be advantageously implemented on any platform in which a user is simultaneously using multiple applications. For example, workspaces may be implemented in a web browser, a cloud-based platform, an operating system, or the like.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Computer Systems

Figure 12:
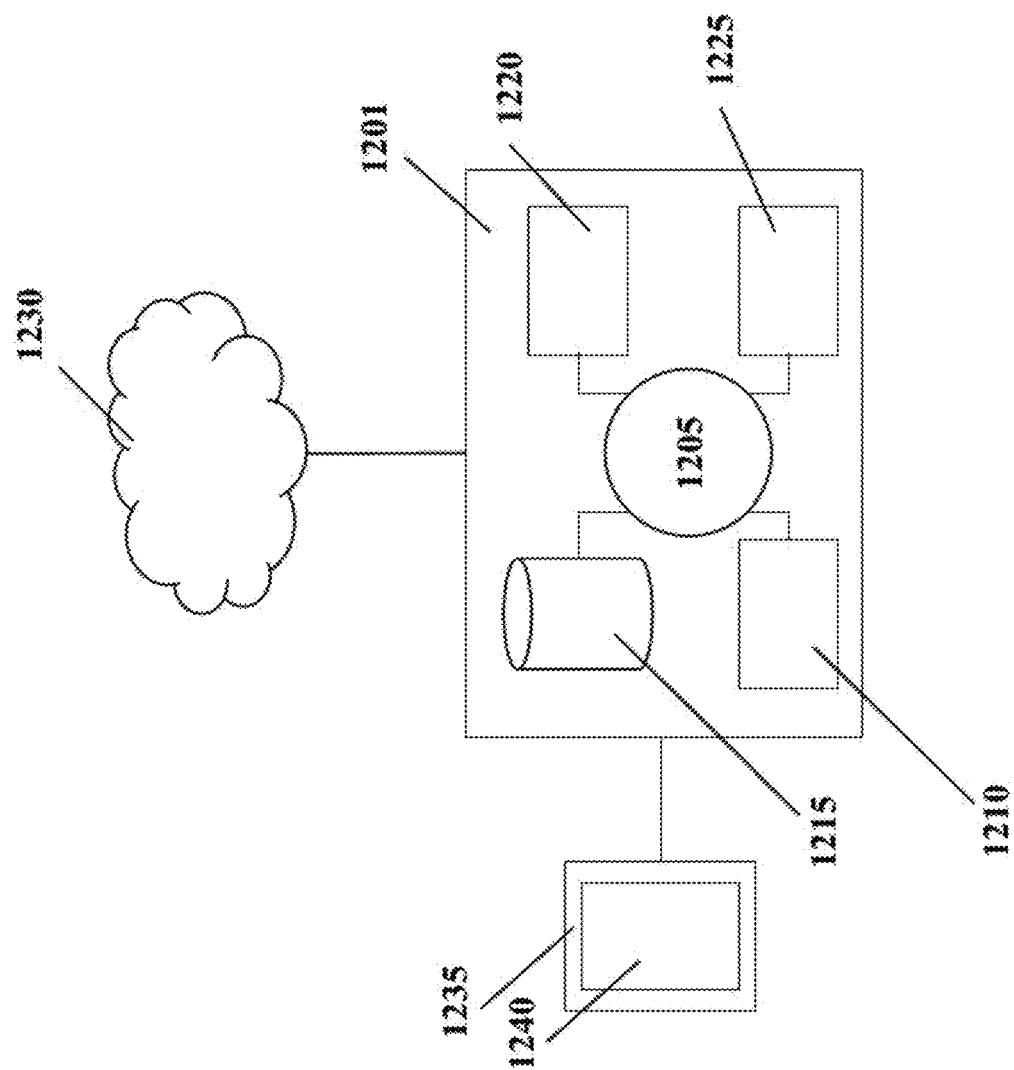
FIG. 12 shows a computer system that is programmed or otherwise configured to implement methods provided herein.

The present disclosure provides computer systems that are programmed to implement methods of the disclosure. FIG. 12 shows a computer system 1201 that is programmed or otherwise configured to provide a desktop application enhancing one or more web-based services. The computer system 1201 can regulate various aspects of providing the application of the present disclosure, such as, for example, retrieving the web-based service and presenting the web-based service. The computer system 1201 can be an electronic device of a user or a computer system that is remotely located with respect to the electronic device. The electronic device can be a mobile electronic device.

The computer system 1201 includes a central processing unit (CPU, also "processor" and "computer processor" herein) 1205, which can be a single core or multi core processor, or a plurality of processors for parallel processing. The computer system 1201 also includes memory or memory location 1210 (e.g., random-access memory, read-only memory, flash memory), electronic storage unit 1215 (e.g., hard disk), communication interface 1220 (e.g., network adapter) for communicating with one or more other systems, and peripheral devices 1225, such as cache, other memory, data storage and/or electronic display adapters. The memory 1210, storage unit 1215, interface 1220 and peripheral devices 1225 are in communication with the CPU 1205 through a communication bus (solid lines), such as a motherboard. The storage unit 1215 can be a data storage unit (or data repository) for storing data. The computer system 1201 can be operatively coupled to a computer network ("network") 1230 with the aid of the communication interface 1220. The network 1230 can be the Internet, an internet and/or extranet, or an intranet and/or extranet that is in communication with the Internet. The network 1230 in some cases is a telecommunication and/or data network. The network 1230 can include one or more computer servers, which can enable distributed computing, such as cloud computing. The network 1230, in some cases with the aid of the computer system 1201, can implement a peer-to-peer network, which may enable devices coupled to the computer system 1201 to behave as a client or a server.

The CPU 1205 can execute a sequence of machine-readable instructions, which can be embodied in a program or software. The instructions may be stored in a memory location, such as the memory 1210. The instructions can be directed to the CPU 1205, which can subsequently program or otherwise configure the CPU 1205 to implement methods of the present disclosure. Examples of operations performed by the CPU 1205 can include fetch, decode, execute, and writeback.

The CPU 1205 can be part of a circuit, such as an integrated circuit. One or more other components of the system 1201 can be included in the circuit. In some cases, the circuit is an application specific integrated circuit (ASIC).

The storage unit 1215 can store files, such as drivers, libraries and saved programs. The storage unit 1215 can store user data, e.g., user preferences and user programs. The computer system 1201 in some cases can include one or more additional data storage units that are external to the computer system 1201, such as located on a remote server that is in communication with the computer system 1201 through an intranet or the Internet.

The computer system 1201 can communicate with one or more remote computer systems through the network 1230. For instance, the computer system 1201 can communicate with a remote computer system of a user (e.g., a desktop user). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1201 via the network 1230.

Methods as described herein can be implemented by way of machine (e.g., computer processor) executable code stored on an electronic storage location of the computer system 1201, such as, for example, on the memory 1210 or electronic storage unit 1215. The machine executable or machine readable code can be provided in the form of software. During use, the code can be executed by the processor 1205. In some cases, the code can be retrieved from the storage unit 1215 and stored on the memory 1210 for ready access by the processor 1205. In some situations, the electronic storage unit 1215 can be precluded, and machine-executable instructions are stored on memory 1210.

The code can be pre-compiled and configured for use with a machine having a processer adapted to execute the code or can be compiled during runtime. The code can be supplied in a programming language that can be selected to enable the code to execute in a pre-compiled or as-compiled fashion.

Aspects of the systems and methods provided herein, such as the computer system 1201, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1201 can include or be in communication with an electronic display 1235 that comprises a user interface (UI) 1240 for providing, for example, a desktop application providing a web-based service. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1205. The algorithm can, for example, determine a type of web-based service.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for enhancing a web-based application using a desktop-based application, the method comprising:
   (a) rendering a web-based document provided by said web-based application with said desktop-based application, wherein said desktop-based application comprises a desktop graphical user interface (GUI) that appears native to a computer and one or more enhanced features that are not available within said web-based application, wherein said one or more enhanced features comprise at least an account delegation engine, and wherein rendering said web-based document with said desktop-based application comprises:
      i) retrieving the web-based document from a universal resource locator (URL),
      ii) injecting into the web-based document at least one script executable by a web content renderer of the desktop-based application,
      iii) displaying, by the web content renderer, a content of the web-based document using the desktop GUI, wherein the web content renderer executes the at least one script to remove at least one visual element from a browser window such that the desktop GUI appears native to said computer and implement the one or more enhanced features for display within the desktop GUI;
   (b) receiving a user input via said desktop GUI of said desktop-based application executed on said computer, which user input is for selecting a user account from a plurality of user accounts provided by said account delegation engine; and (c) using said desktop GUI of said desktop-based application to display said web-based application along with one or more other web-based applications associated with said user account selected in (b).

2. The method of claim 1, wherein said web-based application comprises at least one tool selected from the group consisting of an email tool, a calendar tool, a word processing tool, a spreadsheet tool, a presentation tool, a storage-based tool, a content management tool, enterprise management tool, and a task management tool.

3. The method of claim 1, wherein said user account is assigned a color different from another color of another user account of said plurality of user accounts.

4. The method of claim 1, wherein said web-based application is an electronic mail (email) application that is displayed with multiple tabs associated with multiple user accounts using said desktop-based application.

5. The method of claim 4, wherein said desktop GUI displays said web-based application in different colors associated with said multiple user accounts.

6. The method of claim 4, wherein said one or more enhanced features comprise a plurality of filtering options for filtering emails by recent days, importance and attachments.

7. The method of claim 1, wherein said at least one visual element removed from a browser window comprises a URL address of said web-based document.

8. The method of claim 1, wherein said one or more enhanced features further comprise a search tool allowing a user to perform a search across said web-based application and said one or more other web-based applications, and wherein said search tool is displayed on said desktop GUI in a format native to said computer.

9. The method of claim 1, wherein said one or more enhanced features further comprises a video conferencing window.

10. The method of claim 9, wherein at least a portion of said video conferencing window is at least partially transparent.

11. The method of claim 9, wherein at least a portion of said video conferencing window comprises one or more graphical elements that are movable on a desktop of an operating system of said computer.

12. A non-transitory computer-readable medium comprising machine-executable instructions that, upon execution by one or more computer processors, implements a method for enhancing a web-based application using a desktop-based application, said method comprising:

(a) rendering a web-based document provided by said web-based application with said desktop-based application, wherein said desktop-based application comprises a desktop graphical user interface (GUI) that appears native to a computer and one or more enhanced features that are not available within said web-based application, wherein said one or more enhanced features comprise at least an account delegation engine, and wherein rendering said web-based document with said desktop-based application comprises:
   i) retrieving the web-based document from a universal resource locator (URL),
   ii) injecting into the web-based document at least one script executable by a web content renderer of the desktop-based application,
   iii) displaying, by the web content renderer, a content of the web-based document using the desktop GUI, wherein the web content renderer executes the at least one script to remove at least one visual element from a browser window such that the desktop GUI appears native to said computer and implement the one or more enhanced features for display within the desktop GUI;

(b) receiving a user input via said desktop GUI of said desktop-based application executed on a computer, which user input is for selecting a user account from a plurality of user accounts provided by said account delegation engine; and (c) using said desktop GUI of said desktop-based application to display said web-based application along with one or more other web-based applications associated with said user account selected in (b).

13. The non-transitory computer-readable medium of claim 12, wherein said web-based application comprises at least one tool selected from the group consisting of an email tool, a calendar tool, a word processing tool, a spreadsheet tool, a presentation tool, a storage-based tool, a content management tool, enterprise management tool, and a task management tool.

14. The non-transitory computer-readable medium of claim 12, wherein said user account is assigned a color different from another color of another user account of said plurality of user accounts.

15. The non-transitory computer-readable medium of claim 12, wherein said web-based application is an electronic mail (email) application that is displayed with multiple tabs associated with multiple user accounts using said desktop-based application.

16. The non-transitory computer-readable medium of claim 15, wherein said desktop GUI displays said web-based application in different colors associated with said multiple user accounts.

17. The non-transitory computer-readable medium of claim 15, wherein said one or more enhanced features comprise a plurality of filtering options for filtering emails by recent days, importance and attachments.

18. The non-transitory computer-readable medium of claim 12, wherein said at least one visual element removed from a browser window comprises a URL address of said web-based document.

19. The non-transitory computer-readable medium of claim 12, wherein said one or more enhanced features further comprise a search tool allowing a user to perform a search across said web-based application and said one or more other web-based applications, and wherein said search tool is displayed on said desktop GUI in a format native to said computer.

20. The non-transitory computer-readable medium of claim 12, wherein said one or more enhanced features further comprises a video conferencing window and wherein at least a portion of said video conferencing window is at least partially transparent.

21. The non-transitory computer-readable medium of claim 20, wherein at least a portion of said video conferencing window comprises one or more graphical elements that are movable on a desktop of an operating system of said computer.

22. A system for enhancing a web-based application using a desktop-based application, comprising a computer comprising one or more computer processors that are individually or collectively programmed to:

(a) render a web-based document provided by said web-based application with said desktop-based application, wherein said desktop-based application comprises a desktop graphical user interface (GUI) that appears native to said system and one or more enhanced features that are not available within said web-based application, wherein said one or more enhanced features comprise at least an account delegation engine, and wherein rendering said web-based document with said desktop-based application comprises:
  i) retrieving the web-based document from a universal resource locator (URL),
  ii) injecting into the web-based document at least one script executable by a web content renderer of the desktop-based application,
  iii) displaying, by the web content renderer, a content of the web-based document using the desktop GUI, wherein the web content renderer executes the at least one script to remove at least one visual element from a browser window such that the desktop GUI appears native to said system and implement the one or more enhanced features for display within the desktop GUI;
(b) receive a user input via said desktop GUI of said desktop-based application executed on said computer, which user input is for selecting a user account from a plurality of user accounts provided by said account delegation engine; and
(c) use said desktop GUI of said desktop-based application to display said web-based application along with one or more other web-based applications associated with said user account selected in (b).

* * * * *